(12) United States Patent
Matsukawa et al.

(10) Patent No.: US 6,470,336 B1
(45) Date of Patent: Oct. 22, 2002

(54) DOCUMENT IMAGE SEARCH DEVICE AND RECORDING MEDIUM HAVING DOCUMENT SEARCH PROGRAM STORED THEREON

(75) Inventors: Yoshihiko Matsukawa, Nara (JP); Taro Imagawa, Osaka (JP); Kenji Kondo, Osaka (JP); Tsuyoshi Mekata, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 128 days.

(21) Appl. No.: 09/644,721

(22) Filed: Aug. 23, 2000

(30) Foreign Application Priority Data

Aug. 25, 1999 (JP) .......................................... 11-238031

(51) Int. Cl.[7] .............................................. G06F 17/30
(52) U.S. Cl. .................... 707/4; 707/3; 707/5; 717/146; 382/103; 382/190; 382/229
(58) Field of Search ................................ 707/2, 3, 4, 5; 717/146; 382/103, 190, 229

(56) References Cited

U.S. PATENT DOCUMENTS

| | | | | |
|---|---|---|---|---|
| 4,985,863 | A | * 1/1991 | Fujisawa et al. | 382/229 |
| 5,287,275 | A | * 2/1994 | Kimura | 707/5 |
| 5,479,570 | A | * 12/1995 | Imagawa et al. | 706/20 |
| 6,102,969 | A | * 8/2000 | Christianson et al. | 717/8 |
| 6,151,598 | A | * 11/2000 | Shaw et al. | 707/3 |
| 6,182,062 | B1 | * 1/2001 | Fujisawa et al. | 707/3 |
| 6,307,963 | B1 | * 10/2001 | Nishida et al. | 382/190 |
| 2002/0041713 | A1 | * 4/2002 | Imagawa et al. | 382/229 |
| 2002/0073213 | A1 | * 6/2002 | Mekata et al. | 709/229 |
| 2002/0080998 | A1 | * 6/2002 | Matsukawa et al. | 382/103 |

FOREIGN PATENT DOCUMENTS

JP 2000-57315 2/2000

* cited by examiner

Primary Examiner—Charles L. Rones
(74) Attorney, Agent, or Firm—Renner, Otto, Boisselle & Sklar

(57) ABSTRACT

A document search device searches for a keyword in a recognition result obtained by character recognition performed on a document image. The keyword includes at least one first character, and a character code is assigned to each of the at least one first character. The recognition result includes at least one second character, and a character code and a partial area of the document image are assigned to each of the at least one second character. The document search device includes a first matching portion specification section for determining whether or not the recognition result includes at least one first matching portion which matches the keyword based on a comparison of the character codes, and for, when it is included, specifying the at least one first matching portion; a first portion specification section for determining whether or not a remaining part of the recognition result other than the at least one first matching portion includes at least one first portion which fulfills a prescribed first condition, and for, when it is include, specifying the at least first portion; and a second matching portion specification section for determining whether or not the at least one first portion includes at least one second matching portion which matches the keyword based on a comparison of a feature amount of the partial area with a feature amount of an image of at least one first character included in the keyword, and for, when it is included, specifying the at least one second matching portion. The prescribed first condition includes a condition that the at least one first portion is in the vicinity of a specific second character having a width smaller than a prescribed value.

14 Claims, 25 Drawing Sheets

Document image data $D_i$

Character recognition result $D_c$

|  | Character code $C_c[j]$ | Character coordinate | | | | Reliability degree $C_r[j]$ |
|---|---|---|---|---|---|---|
|  |  | Upper left coordinate $(x_1[j], y_1[j])$ | | Lower right coordinate $(x_2[j], y_2[j])$ | | |
| $D_c[0]$ | 琵 | 65 | 55 | 190 | 214 | 0.830440 |
| $D_c[1]$ | 琶 | 193 | 55 | 318 | 215 | 0.832950 |
| $D_c[2]$ | 三 | 321 | 55 | 356 | 215 | 0.014170 |
| $D_c[3]$ | 古 | 356 | 56 | 401 | 215 | 0.632430 |
| $D_c[4]$ | 月 | 401 | 62 | 446 | 212 | 0.788790 |
| $D_c[5]$ | 畔 | 449 | 56 | 574 | 215 | 0.937243 |
| $D_c[6]$ | で | 577 | 57 | 702 | 212 | 0.830440 |
| $D_c[7]$ | 、 | 705 | 57 | 730 | 215 | 0.805630 |

FIG.2C

Keyword $K_w$ $K_w =$ "琵琶湖畔"

Search result $RD_t$, Detection portion data $RD_t[t]$ $$RD_t \begin{cases} RD_t[0] = (D_c[0], D_c[1], (D_c[2], D_c[3], D_c[4]), D_c[5]) \\ RD_t[1] = (D_c[19], D_c[20], D_c[21], D_c[22]) \\ \vdots \\ RD_t[N_r - 1] = \cdots \cdots \end{cases}$$

Character block data Dt

| | Character code | Character block coordinate (2201) | | | | Number of characters (2202) | Direction information (2203) |
|---|---|---|---|---|---|---|---|
| | | 65 | 55 | 1294 | 215 | 9 | 0 |
| Dc[0] | 363d | 65 | 55 | 263 | 214 | | 0.030440 |
| Dc[1] | 4974 | 280 | 55 | 405 | 215 | | 0.132950 |
| Dc[2] | 4b68 | 408 | 55 | 532 | 215 | | 0.014170 |
| Dc[3] | 4559 | 535 | 56 | 660 | 215 | | 0.232430 |
| Dc[4] | 467e | 663 | 62 | 784 | 212 | | 0.888790 |
| Dc[5] | 482b | 789 | 56 | 915 | 215 | | 0.337243 |
| Dc[6] | 4b2d | 918 | 57 | 1037 | 212 | | 0.030440 |
| Dc[7] | 4567 | 1045 | 57 | 1168 | 215 | | 0.005630 |
| Dc[8] | 4e5f | 1171 | 57 | 1293 | 212 | | 0.092000 |
| | Character code | Character coordinate | | | | | Reliability degree |

⋮

「化」   ⇒   
$K_w[2]$   Image creation

Keyword $K_w$: "少子化"

$$K_{ww}[2] = a \cdot \frac{c}{b}$$

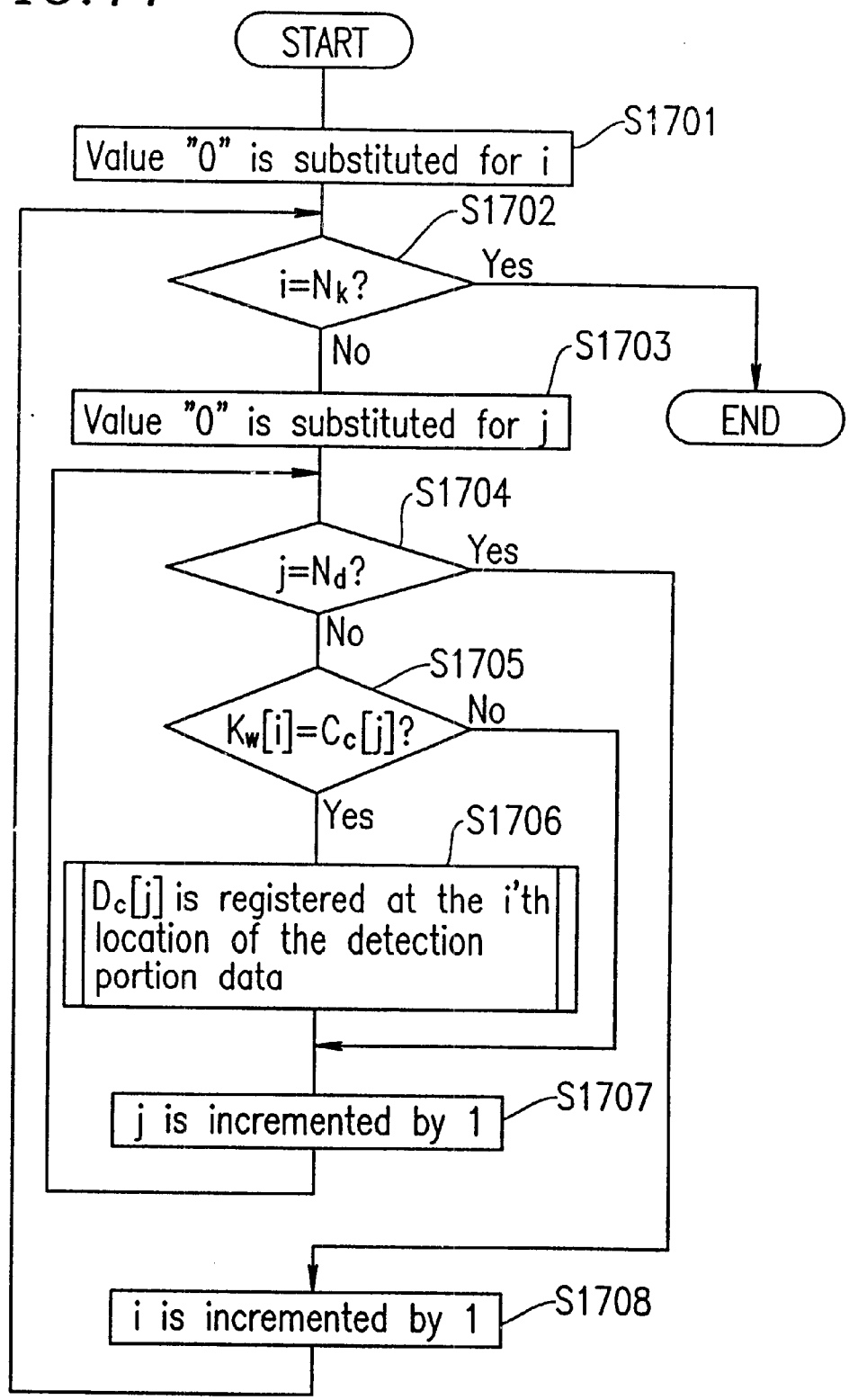

FIG.18

$$\begin{cases} & \quad\; 0 \quad\;\; 1 \quad\;\; 2 \leftarrow \text{Number corresponding to} \\ & \qquad\qquad\qquad\qquad\quad \text{each of the keyword characters} \\ RD_t[0] = (\; 琵 ,\; 琶 ,\; *\; ) \\ \qquad\quad\;\; \| \quad\;\; \| \qquad \diagdown 1861 \\ \qquad\; D_c[0] \;\; D_c[1] \\ \\ RD_t[1] = (\; 琵 ,\; 琶 ,\; 湖\; ) \\ \qquad\quad\;\; \| \quad\;\; \| \quad\;\; \| \\ \qquad\; D_c[51]\, D_c[52]\, D_c[53] \\ \qquad \vdots \\ RD_t[N_r-1] \qquad\qquad *:\text{wildcard} \end{cases}$$

———— Search result: $RD_{t1}$

FIG.20A $$RD_t[0]=(\underset{\underset{D_c[0]}{\parallel}}{\overset{0}{琵}}, \underset{\underset{D_c[1]}{\parallel}}{\overset{1}{琶}}, \overset{2}{*}, \overset{3}{*}) \leftarrow \text{Number corresponding to each of the keyword characters}$$

*: wildcard

~2062

FIG.20B $$RD_t[0]=(\underset{\underset{D_c[0]}{\parallel}}{琵}, \underset{\underset{D_c[1]}{\parallel}}{琶}, *, \underset{\underset{D_c[5]}{\parallel}}{畔})$$

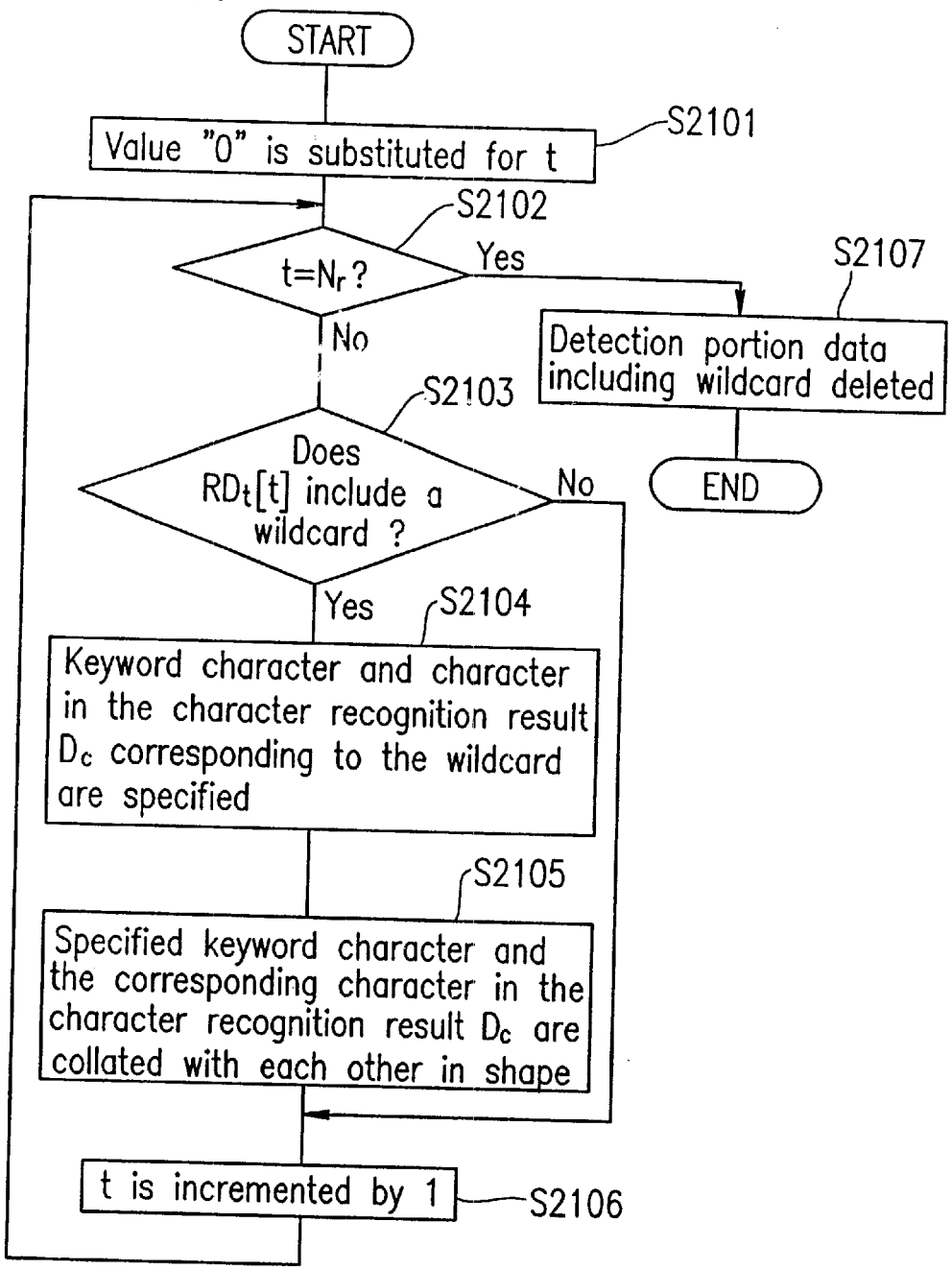

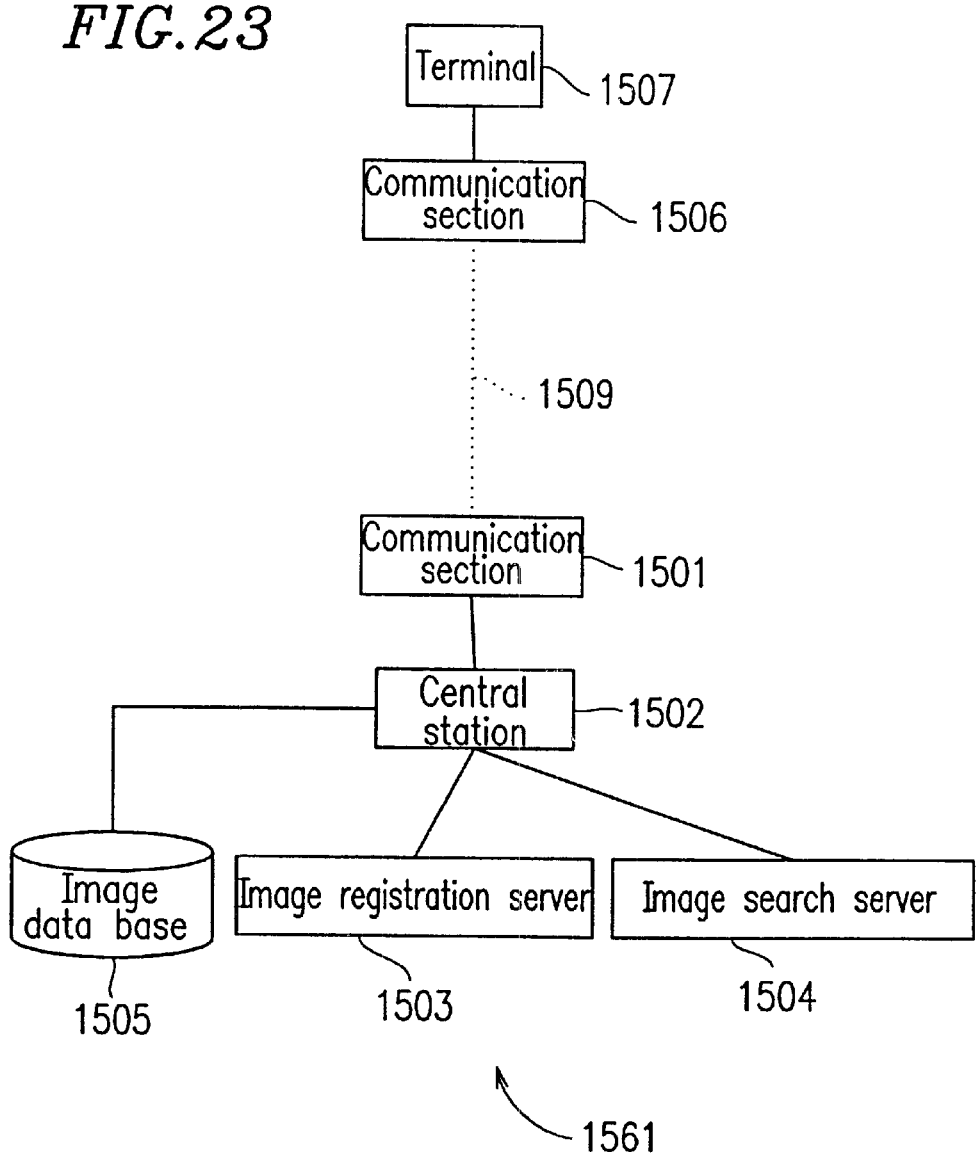

FIG.24A

| Original document | ・・・日本の人口構成は・・・ |
|---|---|
| Character recognition result (character code) | ・・・日木の人区構成は・・・ |

FIG.24B

| | Target character | Mistakenly recognizable characters (similar character list) |
|---|---|---|
| 99-1 | 本 | 木、大、太、才 |
| 99-2 | 口 | 口、回、円、々 |

DOCUMENT IMAGE SEARCH DEVICE AND RECORDING MEDIUM HAVING DOCUMENT SEARCH PROGRAM STORED THEREON

BACKGROUND OF THE INVENTION

1. Field of the Invention

The present invention relates to a document search device for searching for a keyword based on a recognition result obtained by character recognition of a document image and a recording medium having a document search program stored thereon.

2. Description of the Related Art

In general, in order to accumulate a document in the form of paper in an electronic document data base, the document in the form of paper is read as image data, and character recognition of the data is performed to convert the data into a collection of electronic character codes (character recognition result). Thus, the document is accumulated in the document data base as the collection of character codes. In order to search for a keyword from the document data base, it is determined whether the keyword is included in the character recognition result. In the case of generally used character recognition some of the characters written in the original document (document in the form of paper) may not be correctly converted into character codes. When such an error occurs in the character recognition, the characters represented by the character codes may be different from the characters in the original document. In this case, when a search for a keyword is performed in the collection of character codes accumulated in the document data base, a search omission may possibly occur. The phrase "search omission" is defined to indicate that a character string is not detected as a result of the search for a keyword despite that the original document includes a character string which corresponds to the keyword.

A known technology for preventing the search omission is described in, for example, Japanese Laid-Open Publication No. 7-152774.

In accordance with the technology described in Japanese Laid-Open Publication No. 7-152774, an expanded character string is developed at the time of search, using a similar character list for a character or characters, among the characters included in the keyword, which are easily mistaken for other character(s). The similar character list includes a plurality of characters which can be mistaken for the above-mentioned character(s). These character(s) are easily mistaken since there are other characters having similar shapes thereto.

The conventional technology described in Japanese Laid-Open Publication No. 7-152774 will be described with reference to FIGS. 24A and 24B.

FIG. 24A shows a case in which characters "本('hon')" and "口('koh')" includes in an original document are respectively converted into characters "木('ki')" and "区('ku')" having similar shapes thereto by an error in character recognition. The character recognition result is a collection of character codes, but in FIG. 24A, the character codes are shown by the characters corresponding to the character codes for easier understanding. Although the original document includes keyword "日本('nihon')", a search omission occurs when keyword "日本('nihon')" is searched for using the character recognition result.

FIG. 24B shows an example of a similar character list. Row 99-1 shows that the character "本('hon')" is easily mistaken for characters "木('ki')", "大('dai')", "太('futo')" and "才('sai')". Row 99-2 shows that the character "口" is easily mistaken for characters "□" (square symbol), "回('kai')", "円('en')" and "夕('nado')".

In accordance with the conventional technology described in Japanese Laid-Open Publication No. 7-152774, keyword "日本('nihon')" is searched for in the following manner. Using the similar character list shown in FIG. 24B, developed character strings "日木('nichiki')", "日大('nichidai')", "日太('nichifuto')" and "日才('nichisai')" are created. When keyword "日本('nihon')" is searched for using the character recognition result, the developed character strings "日木('nichiki')", "日大('nichidai')", "日太('nichifuto')" and 日才"('nichisai')" are also used as the keyword. Thus, "日木('nichiki')" which has been mistakenly converted from "日本('nihon')" by character recognition can be found.

By this technology disclosed by Japanese Laid-Open Publication No. 7-152774, when a character included in the document is mistaken for a character which is not included in the similar character list, a search omission cannot be avoided. For example, it is assumed that keyword "人口('jinkoh')" is searched for using the character recognition result shown in FIG. 24A. Character "区('ku')", which is mistakenly converted from character "口('koh')" is not included in the similar character list for character "口('koh')" shown in row 99-2 of FIG. 24B. Therefore, developed character string "人区('jinku')" is not searched for, and thus a search omission occurs.

In order to reduce the undesirable possibility of such a search omission, the number of characters included in the similar character list can be increased. However, this increases the number of developed character strings and thus raises the costs (i.e., time and calculation amount) for the search.

SUMMARY OF THE INVENTION

According to one aspect of the invention, a document search device for searching for a keyword in a recognition result obtained by character recognition performed on a document image is provided. The keyword includes at least one first character, and a character code is assigned to each of the at least one first character. The recognition result includes at least one second character, and a character code and a partial area of the document image are assigned to each of the at least one second character. The document search device includes a first matching portion specification section for determining whether or not the recognition result includes at least one first matching portion which matches the keyword based on a comparison of the character code assigned to the at least one first character with the character code assigned to the at least one second character, and for specifying the at least one first matching portion when the recognition result includes the at least one first matching portion; a first portion specification section for determining whether or not a remaining part of the recognition result other than the at least one first matching portion includes at least one first portion which fulfills a prescribed first condition, and for specifying the at least first portion when the remaining part includes the at least first portion; and a second matching portion specification section for determining whether or not the at least one first portion includes at least one second matching portion which matches the keyword based on a comparison of a feature amount of the partial area of the document image associated to the at least one second character included in the at least one first portion with a feature amount of an image of at least one first character included in the keyword, and for specifying the at least one second matching portion when the at least one first portion includes the at least one second matching portion. The prescribed first condition includes a condition that the at least one first portion is in the vicinity of a specific second character having a width smaller than a prescribed value.

In one embodiment of the invention, the second matching portion specification section includes a first determination section of determining whether or not the character code of a specific second character included in the at least one first portion matches the character code of a specific first character included in the keyword; a non-matching character specification section for, when the character code of the specific second character included in the at least one first portion does not match the character code of the specific first character included in the keyword, specifying one second character or two or more continuous second characters which include at least the specific second character included in the at lest one first portion and has a width closest to a width of the specific first character as a non-matching character, and a second determination section for, when a distance between a feature amount of an image of the specific first character and a feature amount of an image of an area including one partial area or two or more partial areas assigned to the one second character or two or more continuous second characters included in the non-matching character is smaller than a prescribed value, determining that the specific first character matches the non-matching character.

In one embodiment of the invention, the document search device further includes a calculation section for calculating a prescribed determination reference value from the at least one first matching portion, and a detection section for detecting a second matching portion which fulfills a prescribed second condition among the at least one second matching portion based on the prescribed determination reference value.

In one embodiment of the invention, the calculation section calculates the prescribed determination reference value based on the feature amount of the document image of the at least one area assigned to the at least one second character included in the at least one first matching portion, and the prescribed second condition includes a condition that a distance between the feature amount of the document image of the at least one partial area assigned to the at least one second character included in the at least one second matching portion and the prescribed determination reference value is smaller than a prescribed value.

According to another aspect of the invention, a document search device for searching for a keyword in a recognition result obtained by character recognition performed on a document image is provided. The keyword includes at least one first character, and a character code is assigned to each of the at least one first character. The recognition result includes at least one second character, and a character code and a partial area of the document image are assigned to each of the at least one second character. The document search device includes a first matching portion specification section for determining whether or not the recognition result includes at least one first matching portion which matches the keyword based on a comparison of the character code assigned to the at least one first character with the character code assigned to the at least one second character, and for specifying the at least one first matching portion when the recognition result includes the at least one first matching portion; a first portion specification section for determining whether or not a remaining part of the recognition result other than the at least one first matching portion includes at least one first portion which fulfills a prescribed first condition, and for specifying the at least one first portion when the remaining part includes the at least one first portion; and a second matching portion specification section for determining whether or not the at least one first portion includes at least one second matching portion which matches the keyword based on a comparison of a feature amount of the partial area of the document image assigned to the at least one second character included in the at least one first portion with a feature amount of an image of at least one first character included in the keyword, and for specifying the at least one second matching portion when the at least one first portion includes the at least one second matching portion. A reliability degree of character recognition is further assigned to each of the at least one second character, and the prescribed first condition includes a condition that the at least one first portion is in the vicinity of a specific second character having the reliability degree lower than a prescribed threshold value.

In one embodiment of the invention, the document search device further includes a section for determining an image quality of the document image, and a section for determining the prescribed threshold value based on the image quality of the document image.

In one embodiment of the invention, the second matching portion specification section includes a first determination section for determining whether or not the character code of a specific second character included in the at least one first portion matches the character code of a specific first character included in the keyword; a non-matching character specification section for, when the character code of the specific second character included in the at least one first portion does not match the character code of the specific first character included in the keyword, specifying one second character or two or more continuous second characters which include at least the specific second character included in the at least one first portion and has a width closest to a width of the specific first character as a non-matching character, and a second determination section for, when a distance between a feature amount of an image of the specific first character and a feature amount of an image of an area including one partial area or two or more partial areas assigned to the one second character or two or more continuous second characters included in the non-matching character is smaller than a prescribed value, determining that the specific first character matches the non-matching character.

In one embodiment of the invention, the document search device further includes a calculation section for calculating a prescribed determination reference value from the at least one first matching portion, and a detection section for detecting a second matching portion which fulfills a prescribed second condition among the at least one second matching portion based on the prescribed determination reference value.

In one embodiment of the invention, the calculation section calculates the prescribed determination reference value based on the feature amount of the document image of the at least one area assigned to the at least one second character included in the at least one first matching portion, and the prescribed second condition includes a condition that a distance between the feature amount of the document image of the at least one partial area assigned to the at least one second character included in the at least one second matching portion and the prescribed determination reference value is smaller than a prescribed value.

According to still another aspect of the invention, a document search device for searching for a keyboard in a recognition result obtained by character recognition performed on a document image includes a first determination section for determining whether or not the recognition result includes a partially matching portion with which a part of the keyword matches but the entirety of the keyword does not match, in accordance with a first reference; a first non-matching portion specification section for, when the recognition result includes the partially matching portion, specifying a first non-matching portion of the keyword which does not match the recognition result; a second non-matching portion specification section for specifying a second non-matching portion having a width closest to a width of the first non-matching portion in the partially matching portion; and a second determination section for determining whether or not the first non-matching portion matches the second non-matching portion, in accordance with a second reference which is different from the first reference.

According to still another aspect of the invention, a document search device for searching for a keyword in a recognition result obtained by character recognition performed on a document image is provided. The keyword includes at least one first character, and a character code is assigned to each of the at least one first character. The recognition result includes at least one second character, and a character code and an area of the document image are assigned to each of the at least one second character. The document search device includes a first determination section for determining whether or not at least a part of the keyword matches at least a part of the recognition result based on a comparison of the character code assigned to the at least one first character with the character code assigned to the at least one second character; a first non-matching character specification section for, when a part of the keyword matches the at least a part of the recognition result, specifying a first character among the at least one first character included in the keyword as a first non-matching character; a second non-matching character specification section for specifying one second character or two or more continuous second characters, having a width closest to a width of the first non-matching character, among the at least one second character included in the recognition result as a second non-matching character; and a second determination section for determining whether or not the first non-matching character matches the second non-matching character based on a comparison of a feature amount of an image of the first non-matching character with a feature amount of an image of an area including one partial area or two or more partial areas assigned to the one second character or two or more continuous second characters included in the second non-matching character.

In one embodiment of the invention, the second non-matching character specification section specifies the second non-matching character by making the number of at least one second character variable and repeating a comparison of the width of the first non-matching character and the width of the at least one second character.

In one embodiment of the invention, the second non-matching character specification section calculates a tolerable range of width of the second non-matching character in accordance with the width of the first non-matching character and specifies the second non-matching character under the condition that the second non-matching character has a width within the tolerable range of width.

According to still another aspect of the invention, a recording medium having a program for executing a document search of a keyword in a recognition result obtained as a result of character recognition of a document image is provided. The program including the steps of determining whether or not the recognition result includes a partially matching portion with which a part of the keyword matches but the entirety of the keyword does not match, in accordance with a first reference; specifying a first non-matching portion of the keyword which does not match the recognition result when the recognition result includes the partially matching portion; specifying a second non-matching portion, in the partially matching portion, which has a width closest to the width of the first non-matching portion; and determining whether the first non-matching portion matches the second non-matching portion, in accordance with a second reference which is different from the first reference.

Thus, the invention described herein makes possible the advantages of providing a document search device for reducing search omissions caused by an error in character recognition without raising the costs (i.e., time and calculation amount) for the search; and a recording medium having a document search program stored thereon.

These and other advantages of the present invention will become apparent to those skilled in the art upon reading and understanding the following detailed description with reference to the accompanying figures.

BRIEF DESCRIPTION OF THE DRAWINGS

FIG. 2C shows a data structure of a keyword $K_w$;

FIG. 2D is shows a data structure of a search result $RD_i$;

FIG. 3 shows a structure of character block data $D_i$;

FIG. 17 is a flowchart illustrating an operation procedure performed by a wildcard search section 401 shown in FIG. 16;

FIG. 18 shows a search result $RD_{t1}$ obtained by the procedure shown in FIG. 17;

FIG. 20A shows the state of a detection portion $RD_t[0]$ after the collation of the "琵琶湖('biwako')" of the keyword $K_w$ "琵琶湖畔('biwakohan')" is completed;

FIG. 20B shows the state of the detection portion $RD_t[0]$ after a character $D_c[5]$ is registered;

FIG. 21 is a flowchart illustrating an operation procedure of collation of a wildcard performed by a character shape search section 402 shown in FIG. 16;

FIG. 23 is a schematic block diagram illustrating a document search system 1561 in a third example according to the present invention;

FIG. 24A shows an example in which characters "本('hon')" and "口('koh')" included in an original document are converted into character codes corresponding to similar characters "木('ki')" and "区('ku')" due to a character recognition error; and FIG. 24B is an exemplary similar character list.

DESCRIPTION OF THE EMBODIMENTS

First, a document filing system 210 for accumulating documents and searching for a keyword will be described with reference to FIG. 1.

Figure 1:
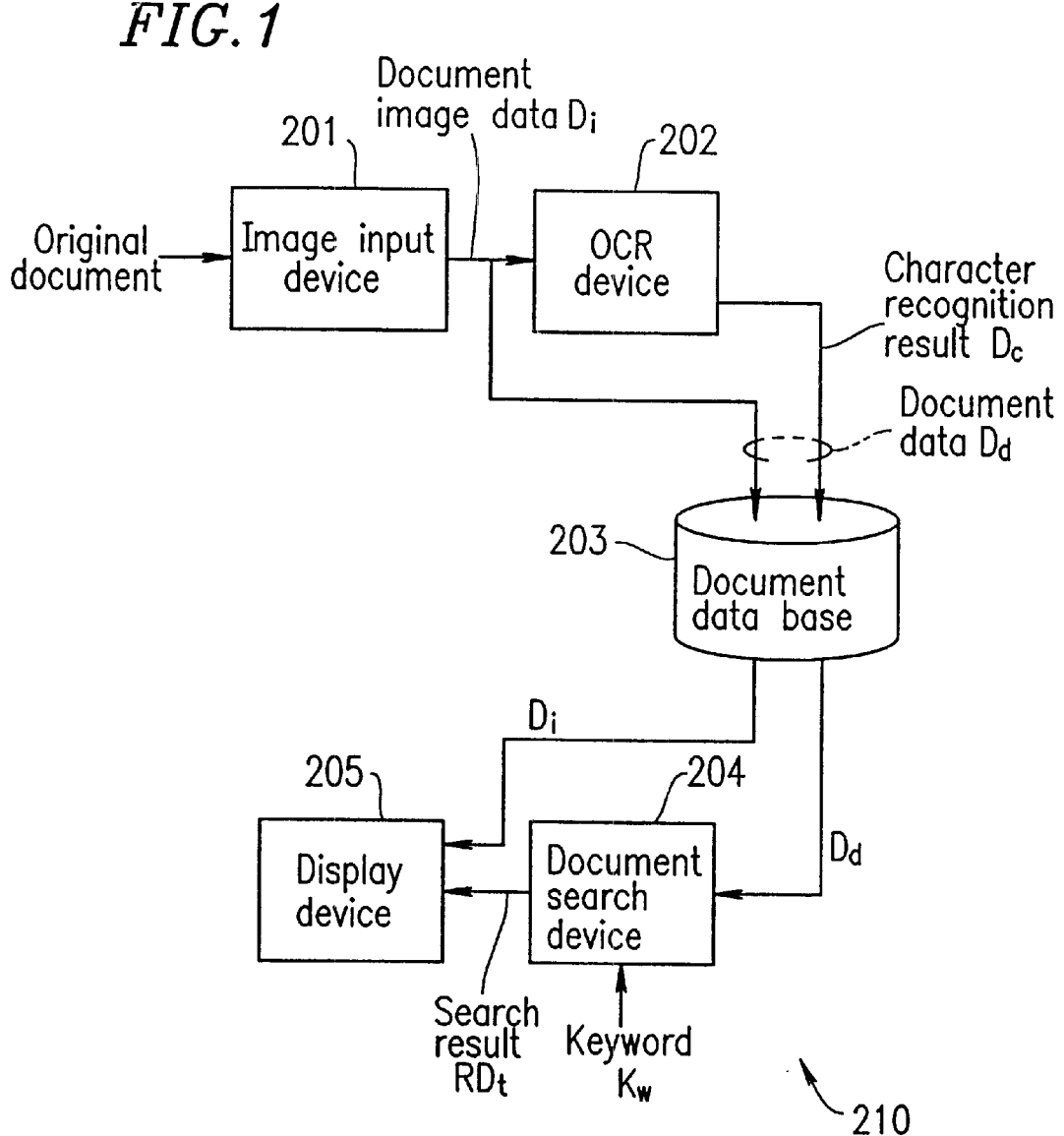
FIG. 1 is a schematic block diagram illustrating a structure of a document filing system 210.

FIG. 1 shows a structure of the document filing system 210. The document filing system 210 includes an image input device 201, an OCR (optical character reader) device 202, a document data base 203, a document search device 204, and a display device 205.

The image input device 201 converts an original document (for example, document in the form of paper) into document image data $D_i$. The image input device 201 is, for example, a scanner or a digital camera.

The OCR device 202 executes character recognition of the document image data $D_i$. For the OCR device 202, a known OCR technology can be used. The result of the character recognition obtained by the OCR device 202 is output from the OCR device 202 as a character recognition result $D_c$.

The document data base 203 has document data $D_d$ stored therein. The document data $D_d$ includes the character recognition result $D_c$ and the document image data $D_i$.

The document search device 204 searches for a keyword $K_w$ in the character recognition result $D_c$ included in the document data $D_d$ stored in the document data base 203. The document search device 204 according to the present invention utilizes the document image data $D_i$ included in the document data $D_d$ when searching for the keyword $K_w$ in the character recognition result $D_c$.

When the keyword $K_w$ is detected from the character recognition result $D_c$, the document search device 204 outputs a search result $RD_t$ to the display device 205.

The display device 205 displays a search result based on the search result $RD_t$. For example, the display device 205 displays the document image data $D_i$ stored in the document data base 203 on a screen. An area in the document image data $D_i$ displayed on the screen which corresponds to the keyword $K_w$ is emphasized in display by, for example, coloring or inversion. The area corresponding to the keyword $K_w$ is determined based on the search result $RD_t$.

Next, data structures of the document image data $D_i$ and the character recognition result $D_c$ will be described.

Figures 2A, 2B:
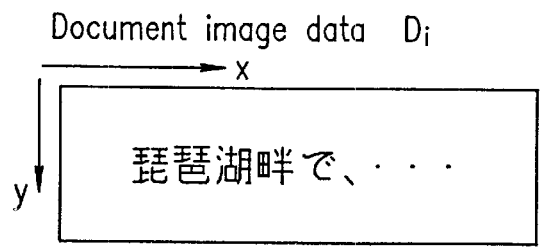
FIG. 2A shows an exemplary structure of a document image data $D_i$.
FIG. 2B shows a data structure of a character recognition result $D_c$ obtained as a result of character recognition of the document image data $D_i$.

FIG. 2A shows an example of the document image data $D_i$. The document image data $D_i$ is, for example, image data in a bit map format.

FIG. 2B shows a data structure of the character recognition result $D_c$ obtained as a result of character recognition of the document image data $D_i$ shown in FIG. 2A. The character recognition result $D_c$ is obtained as a collection of characters $D_c[j]$ ($0 \leq j \leq N_d-1$). "$N_d$" indicates the number of characters included in the character recognition result $D_c$. In this specification, numerical figures included in "[]" each represent an index. To a character $D_c[j]$, a character code $C_c[j]$, character coordinates $(x_1[j], y_1[j])$ and $(x_2[j], y_2[j])$ and a reliability degree $C_r[j]$ are assigned.

The character code $C_c[j]$ is a code determined by the OCR device 202, and is represented by, for example, two bytes. In the example shown in FIG. 2B, the characters corresponding to the character codes are shown instead of the character codes for easier understanding.

The character coordinates indicate a partial area, in the document image data $D_i$, which is recognized as one character by the OCR device 202. The partial area is represented by, for example, a quadrangle. The character coordinate $(x_1[j], y_1[j])$ is at the upper left apex of the quadrangle, and the character coordinate $(x_2[j], y_2[j])$ is at the lower right apex of the quadrangle. As a coordinate system of the character coordinates, an arbitrary coordinate system can be used.

The reliability degree $C_r[j]$ can be defined as, for example, the likelihood, likelihood rate, or probability obtained when the OCR device 202 executes character recognition.

The reliability degree $C_r[j]$ indicates whether the possibility that the result of the character recognition is correct in high or low. In the example shown in FIG. 2B, the reliability degree is represented by a value between 0 and 1. As the reliability degree is closer to 1, the possibility that the result of the character recognition is correct is high.

The character recognized by the OCR device 202 and the character written in the original document do not necessarily correspond to each other one by one. The reason is that there is a possibility that a cut-out error occurs when the OCR device 202 performs the character recognition. The "out-out error" is defined as, for example, that one character in the original document is recognized as a plurality of characters or that a plurality of characters in the original document are recognized as one character. In the example shown in FIGS. 2A and 2B, character "湖('ko')" in the original document is recognized as three characters "三('san')", "古('ko')" and "月('tsuki')" by a cut-out error of the OCR device 202. Accordingly, character "湖('ko')" in the original document corresponds to three characters $D_c[2]$ through $D_c[4]$ in the character recognition result $D_c$. In this manner, one character in the character recognition result $D_c$ can correspond to one character written in the original document, one fraction of a character or a combination of a plurality of fractions of a character.

The arrangement order of characters in the character recognition result $D_c$ is identical with the arrangement order of characters in the original document (for example, from left to right).

In the specification, the term "character" includes characters of specific languages such as Chinese characters, alphabets and the like as well as symbols to which character codes are assigned, such as numerical figures, marks and the like.

The phrase "two or more continuous characters" is defined to indicate two or more characters $D_c[j]$ having continuous indices j in the character recognition result $D_c$.

The "original document" is not limited to a document in the form of paper. The "original document" can be any item having characters thereon.

The document search device 204 according to the present invention searches for the keyword $K_w$ in the character recognition result $D_c$ having the data structure shown in FIG. 2B.

FIG. 2C shows a data structure of the keyword $K_w$. In the example shown in FIG. 2C, the keyword $K_w$ is a character string "琵琶湖畔('biwakohan')" made of four characters. The number of characters of a keyword $K_w$ is not limited to 4. A keyword $K_w$ can include any number of characters of 1 or more. Each character included in a keyword $K_w$ is referred to as a keyword character. The keyword character is represented as $K_w[i]$ using an index i. In this case, $0 \leq i \leq 3$. In general, where the number of characters included in a keyword $K_w$ is $N_k$, the keyword $K_w$ is represented as a character string mode of $N_k$ keyword characters of $K_w[0]$ through $K_w[N_k-1]$.

To each of the keyword characters of $K_w[0]$ through $K_w[N_k-1]$, a character code is assigned. For example, to the keyword character $K_w[0]$ (="琵('bi')"), character code "0x487c" (JIS code) is assigned.

The search result obtained by the document search device 204 is output to the display device 205 as a search result $RD_r$.

FIG. 2D shows a data structure of the search result $RD_r$. The search result $RD_r$ shown in FIG. 2D is the result of a search for the keyword $K_w$ (="琵琶湖畔('biwakohan')") shown in FIG. 2C in the character recognition result $D_c$ shown in FIG. 2B. The search result $RD_r$ is a collection of $N_r$ pieces of detection portion data $RD_r[t]$ ($0 \leq t \leq N_r-1$). The detection portion data $RD_r[t]$ indicates a portion, in the character recognition result $D_c$ as a target of the search (FIG. 2B), which matches the keyword $K_w$ (matching portion). "$N_r$" indicates the number of matching portions.

A detection portion data $RD_r[0]$ is a list including a list element 2241, a list element 2242, a list element 2243 and a list element 2244. The length of the list is equal to the length of the keyword $K_w$ (i.e., the number of keyword characters included in the keyword $K_w$; 4 in this case). Each of the list elements 2241 through 2244 indicates one character, or two or more continuous characters, in the character recognition result $D_c$ corresponding to the four keyword characters $K_w[0]$ through $K_w[3]$ included in the keyword $K_w$, respectively. For example, the list element 2241, i.e., a character $D_c[0]$ corresponds to a keyword character $K_w[0]$ ("琵('bi')"). The list element 2242, i.e., a character $D_c[1]$ corresponds to a keyword character $K_w[1]$ ("琶('wa')"). The list element 2243, i.e., three characters $D_c[2]$ through $D_c[4]$ corresponds to a keyword character $K_w[2]$ ("湖('ko')"). The list element 2244, i.e. a character $D_c[5]$ corresponds to a keyword character $K_w[3]$ ("畔('han')"). The character code of each of the characters $D_c[2]$ through $D_c[4]$ does not match the character code of the keyword character $K_w[2]$ ("湖('ko')") because the characters $D_c[2]$ through $D_c[4]$ are respectively recognized as characters "三('san')", "古('ko')" and "月('tsuki')" by the OCR device 202. In the example shown in FIG. 2D, the document search device 204 combines the three continuous characters $D_c[2]$ through $D_c[4]$ recognized as "三('san')", "古('ko')" and "月('tsuki')" into one group and determines that the group corresponds to keyword $K_w[2]$ ("湖('ko')").

The detection portion data $RD_r[t]$ ($1 \leq t \leq N_r-1$) is a list having a length of $N_k$. "$N_k$" is the length of the keyword $K_w$ (i.e., the number of characters included in the keyword $K_w$) as described above.

The OCR device 202 executes character recognition on the basis of a certain processing unit. The processing unit can be, for example, one page of one paragraph of a document. Such a processing unit is referred to as a "character block".

In one character block, the font and size of the characters are often consistent. Therefore, for improving the search accuracy, it is preferable to execute a search using the character block as one unit.

The characters $D_c[j]$ included in the character recognition result $D_c$ can be grouped on a character block-by-character block basis. Such a group is referred to as character block data $D_t$, and indicates the result of character recognition of one character block.

FIG. 3 shows a structure of a character block data $D_t$.

The character block data $D_t$ includes character block coordinates 2201, number of characters 2202, direction information 2203, and a collection of characters $D_c[j]$ ($D_c[0]$ through $D_c[8]$ in the example shown in FIG. 3).

The character block coordinates 2201 indicate coordinate values defining a quadrangle circumscribing the character block in the document image data $D_i$.

The character number 2202 indicates the number of characters included in the character block data $D_t$.

The direction information 2203 indicates in which direction and characters are written in the character block (whether the characters are written vertically or horizontally). For example, the value of 1 indicates that the characters are written vertically, and the value of 0 indicates that characters are written horizontally.

The character block data $D_t$ can further include information on the font used in the character block.

Hereinafter, the present invention will be described by way of illustrative examples with reference to the accompanying drawings.

EXAMPLE 1

Figure 4:
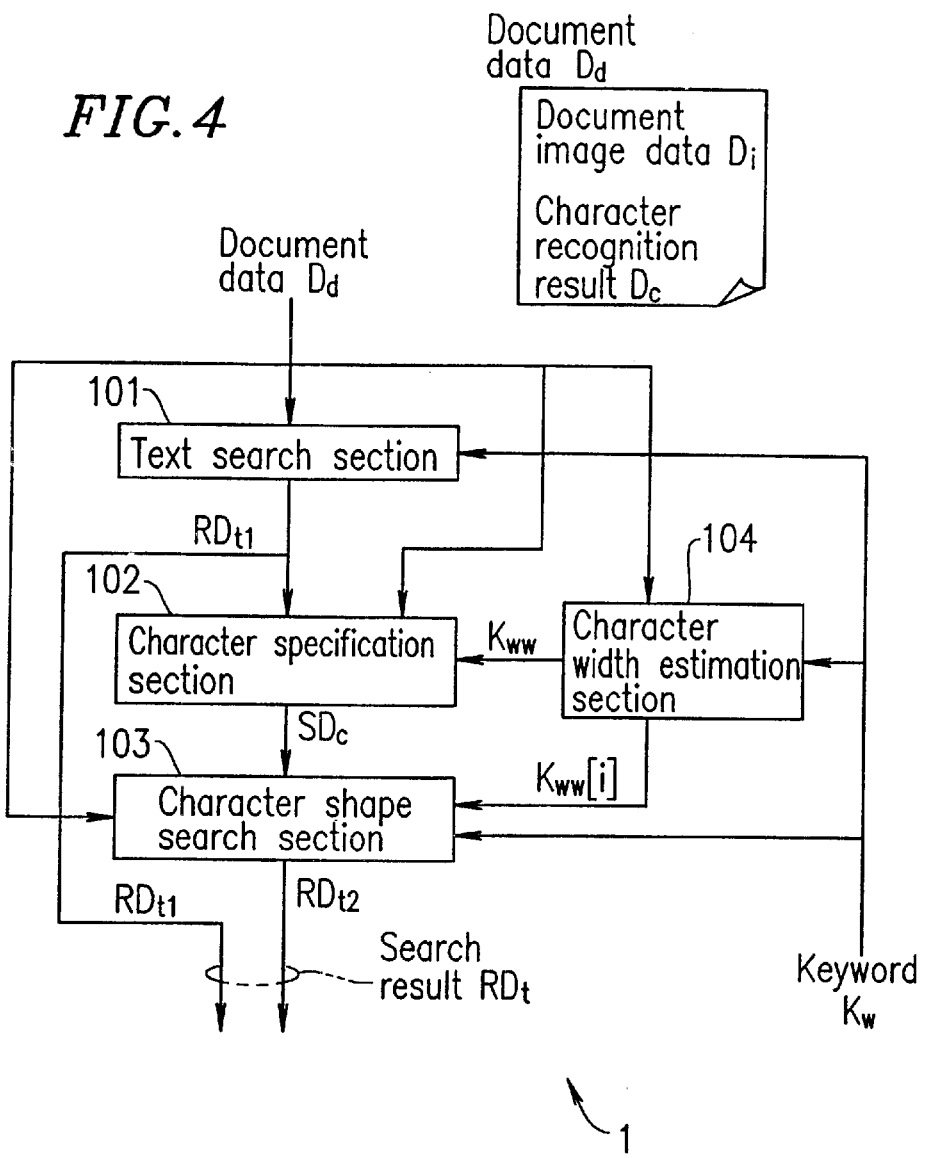
FIG. 4 is a block diagram illustrating a structure of a document search device 1 in a first example according to the present invention.

FIG. 4 shows a structure of a document search device 1 in a first example according to the present invention. The document search device 1 includes a text search section 101, a character specification section 102, a character shape search section 103, and a character width estimation section 104.

The document search device 1 is usable as the document search device 204 shown in FIG. 1. In this case, the document search device 1 searches for a keyword $K_w$ in the document data $D_d$ accumulated in the document data base 203. The document data $D_d$ includes document image data $D_i$ and a character recognition result $D_c$.

In the following description, it is assumed that the characters in the document are written horizontally, namely, from left to right. The procedure for document search processing described below can be applied to the document in which characters are written vertically, by replacing the processing regarding the width and the processing regarding the height respectively with the processing regarding the height and the processing regarding the width. Whether the characters are written vertically or horizontally can be determined by, for example, referring to the direction information 2203 (FIG. 3) included in the character block data $D_r$.

A keyword $K_w$ is input to the document search device 1 from outside, and an instruction to search for the keyword $K_w$ in specific document data $D_d$ is given. The keyword $K_w$ is input and the instruction is given by, for example, an input section such as a keyboard (not shown).

The text search section 101 compares a character code assigned to a keyword character included in the keyword $K_w$ (first character) with a character code assigned to a character included in the character recognition result $D_c$ (second character). When these character codes match each other, the second character is determined to match the first character. Where the length of the keyword $K_w$ is $N_k$ and each of the $N_k$ continuous characters in the character recognition result $D_c$ matches the corresponding one of the $N_k$ characters in the keyword $K_w$, the text search section 101 specifies the $N_k$ continuous characters in the character recognition result $D_c$ as a matching portion which matches the keyword $K_w$ (first matching portion). Such a matching portion (first matching portion) can exist in any number of one or more in the character recognition result $D_c$. The text search section 101 outputs the one or more matching portions (first matching portions) as a first search result $RD_{r1}$. The number of the first matching portions included in the first search result $RD_{r1}$ is $N_{r1}$. The first search result $RD_{r1}$ includes detection portion data $RD_{r1}[t]$, where $0 \leq t \leq (N_{r1}-1)$. The detection portion data $RD_{r1}[t]$ indicates one first matching portion among one or more first matching portions specified by the text search section 101. The detection portion data $RD_{r1}[t]$ is a list including an equal number of list elements to the number of the keyword characters included in the keyword $K_w$. Each of the list elements represents a character having the character code which matches the character code of the corresponding keyword character.

In this manner, the text search section 101 acts as a first matching portion specification section for determining whether or not the recognition result $D_c$ includes at least one portion (first matching portion) which matches the keyword based on a comparison of the character codes and for specifying the at least one first matching portion when the recognition result $D_c$ includes the at least one first matching portion.

In the case where there is no error in the character recognition performed by the OCR device 202 (FIG. 1), it is sufficient to perform the search for the keyword in the character recognition result only by the text search section 101. However, as described above, in the case where there is an error in the character recognition performed by the OCR device 202 (FIG. 1), a search performed only by the text search section 101 based on the comparison of character codes may possibly result in a search omission. In other words, there may possibly be a portion or portions which match the keyword $K_w$ in a remaining part of the character recognition result $D_c$ other than the one or more first matching portions specified by the text search section 101.

The character specification section 102 determines whether or not the remaining part of the character recognition result $D_c$ other than the one or more first matching portions specified by the text search section 101 includes at least one character which fulfills a prescribed condition. When the remaining part includes at least one such character, the character specification section 102 specifies the at least such one character as a candidate portion $SD_c$ (first portion). The "prescribed condition" includes condition (1) below:

Condition (1): "The character exists in the vicinity of a specific character having a width smaller than a prescribed width in the character recognition result $D_c$."

The "prescribed condition" includes condition (2) instead of, or in addition to, condition (1).

Condition (2): "The character exists in the vicinity of a specific character having a reliability degree lower than a prescribed reliability degree in the character recognition result $D_c$."

Generally, as the width of a character included in the character recognition result $D_c$ is smaller, the possibility that a cut-out error of the character has occurred in character recognition is high. As the reliability degree of a character included in the character recognition result $D_c$ is lower, the possibility that a cut-out error or a recognition error has occurred in character recognition is high. Accordingly, there is a high possibility that a recognition error has occurred in the vicinity of such a character (i.e., the character having a smaller width or a character having a lower reliability degree). The specific meaning of the phrase "in the vicinity of a specific character" will be described below with reference to FIG. 6.

When the character recognition result $D_c$ does not include any first matching portion, the character specification section 102 determines whether or not the character recognition result $D_c$ includes at least one character which fulfills a prescribed condition. When the character recognition result $D_c$ includes at least one such character, the character specification section 102 specifies at least one such character as a candidate portion $SD_c$ (first portion).

In this manner, the character specification section 102 acts as a first portion specification section for determining whether or not a remaining part of the recognition result $D_c$, other than at least one first matching portion specified by the text search section 101, includes at least one candidate portion $SD_c$ (first portion) which fulfills a prescribed first condition, and for specifying the at least first portion when the remaining part includes the at least first portion.

When the at least one candidate portion $SD_c$ (first portion) is specified, the character shape search section 103 determines whether or not the candidate portion $SD_c$ includes a matching portion which matches the keyword $K_w$ (second matching portion) based on a feature amount of an image of a partial area assigned to each of the characters included in the candidate portion $SD_c$ (second characters) and a feature amount of an image of each of the keyword characters included in the keyword $K_w$ (first characters). The detailed structure and operation of the character shape search section 103 will be described below with reference to FIG. 7.

Such a matching portion (second matching portion) can exist in any number of one or more in the candidate portion $SD_c$. The character shape search section 103 outputs the one or more matching portions (second matching portions) as a second search result $RD_{r2}$. The number of the second matching portions included in the second search result $RD_{r2}$ is $N_{r2}$. The second search result $RD_{r2}$ includes detection portion data $RD_{r2}[t]$, where $0 \leq t \leq (N_{r2}-1)$. The detection portion data $RD_{r2}[t]$ indicates one second matching portion among one or more second matching portions specified by the character shape search section 103. The detection portion data $RD_{r2}[t]$ is a list including an equal number of list elements to the number of the keyword characters included in the keyword $K_w$. Each of the list elements is one character, or two or more continuous characters, the image of which has a feature amount having a distance, from a feature amount of the image of the corresponding keyword character, which is equal to or less than a prescribed threshold value $Thd_1$.

The character width estimation section 104 estimates a character width $K_{ww}[i]$ ($0 \leq i \leq N_k-1$) of each of the keyword characters included in the keyword $K_w$. The character width $K_{ww}[i]$ of each keyword character is used by the character shape search section 103. The character width estimation section 104 estimates a keyword width $K_{ww}$ of the keyword $K_w$. The keyword width $K_{ww}$ of the keyword $K_w$ is used by the character specification section 102.

The search result $RD_{r1}$ obtained by the text search section 101 and the search result $RD_{r2}$ obtained by the character shape search section 103 are output from the document search device 1 as results of a search of the keyword $K_w$ performed in the character recognition result $D_c$.

Figure 5:
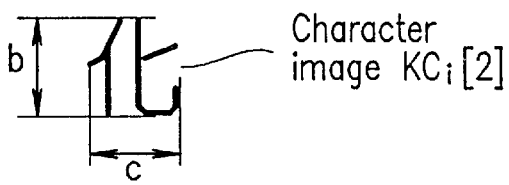
FIG. 5 shows an example of estimation, performed by a character width estimation section 104 shown in FIG. 4, of a width of each character $K_w[i]$ included in the keyword $K_w$.

FIG. 5 shows an example of estimation by the character width estimation section 104 of the character width $K_{ww}[i]$ of a character $K_w[i]$ included in the keyword $K_w$.

In the example shown in FIG. 5, the keyword $K_w$ is "少子化('shoshika')". In this example, the character width $K_{ww}[2]$ of character "化('ka')" (=$K_w[2]$) included in the keyword $K_w$ is estimated as follows.

The character width estimation section 104 finds a character having the greatest height among the characters included in the character recognition result $D_c$, and sets the height of this character as an estimated character height value "a". The height of each character included in the character recognition result $D_c$ can be calculated from the character coordinates assigned to the character.

Alternatively, the estimated character height value "a" can be the height of the character having the greatest height among the characters included in the character block data $D_r$.

Still alternatively, the estimated character height value "a" can be the most frequent height, the average height or the median height, instead of the greatest height. The unit of the width and height of the character may be, for example, one pixel.

The character width estimation section 104 calculates the width $K_{ww}[2]$ of character "化('ka')" (=$K_w[2]$) by expression (1) using a standard height "b" and a standard width "c" of character "化('ka')".

$$K_{ww}[2] = a \cdot c / b \qquad (1)$$

The standard height "b" and the standard width "c" of character "化('ka')" can be found by creating an image of character "化('ka')" (character image $KC_i[2]$) using the font owned by the document search device 1 and obtaining the height and the width of the character image $KC_i[2]$. Alternatively, the ratio of the standard height "b" with respect to the standard width "c", i.e., b/c can be fixed in advance for all the characters. In the case where the character block data $D_t$ includes information on the font used in the character block, the same font can be used when creating the image of character "化('ka')".

Figure 6:
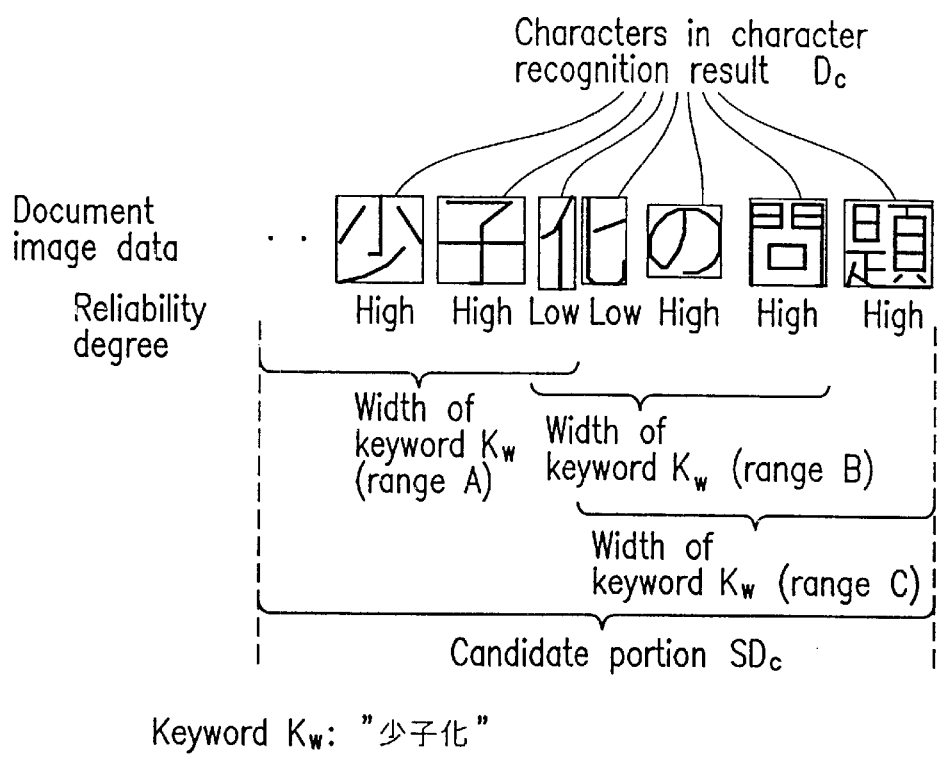
FIG. 6 shows an example of processing for specifying a candidate portion $SD_c$ which fulfills a prescribed condition.

FIG. 6 shows an example of processing for specifying a candidate portion $SD_c$ which fulfills a prescribed condition. This processing is performed by the character specification section 102.

It is assumed that the keyword $K_w$ is "少子化('shoshika')" and the character recognition result $D_c$ includes character string " . . . 少子イヒの問題('shoshi i hi no mondai') . . . ". In FIG. 6, as the character codes in the character recognition result $D_c$, the characters to which the character codes are assigned are shown for easier understanding. In this example, the "prescribed condition" is condition (2).

It is also assumed that, among the reliability degrees assigned to the characters included in the character recognition result $D_c$, the reliability degrees assigned to characters "イ('i')" and "ヒ('hi')" are lower than a prescribed threshold value Thr, and the reliability degrees assigned to the other characters are higher than the prescribed threshold value Thr.

The character width estimation section 104 finds the keyword width $K_{ww}$ of the keyword $K_w$. The keyword width $K_{ww}$ is found as a sum of the widths of the characters included in the keyword $K_w$.

The character specification section 102 specifies a candidate portion $SD_c$ as follows. First, the character specification section 102 finds region A having an equal width to $K_{ww}$ from the character having the reliability degree lower than the threshold value Thr ("イ('i')") as a trailing and (right end) (i.e., the region "少子イ('shoshi i')") and region B having an equal width to $K_{ww}$ from "イ" as a leading end (left end) (i.e., the portion "イヒの問('i hi no mon')"). The phrase "in the vicinity of a specific character" mentioned above means a range which is centered around a specific character (character "イ('i')" in this case) and in which a portion between the specific character and the right end and a portion between the specific character and the left end each have a width equal to $K_{ww}$.

In the case where range B includes another character having a reliability degree lower than the threshold value Thr (character "ヒ('hi')" in this case), range C having an equal width to $K_{ww}$ from "ヒ('hi')" as a leading end is found. The characters included in either range A, B or C are specified as the candidate portion $SD_c$.

Figure 7:
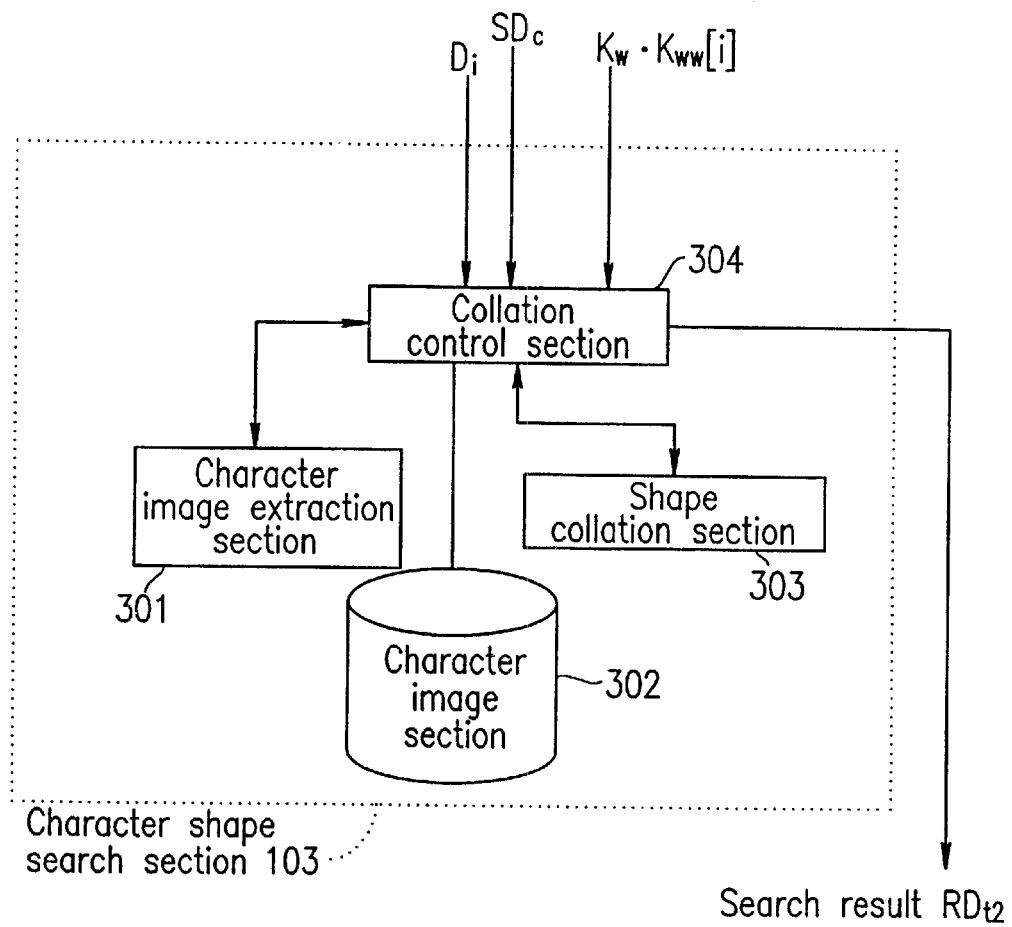
FIG. 7 is a block diagram illustrating a detailed structure of a character shape search section 103 shown in FIG. 4.

FIG. 7 shows a detailed structure of the character shape search section 103.

The character shape search section 103 includes a character image extraction section 301, a character image table 302, a shape collation section 303, and a collation control section 304.

The character image extraction section 301 specifies one character, or two or more continuous characters, having a width which is closest to the width of a specific character in the keyword $K_w$ as a non-matching character, and extracts an area of the document image (i.e., character image) corresponding to the non-matching character. The "non-matching character" can include a plurality of characters when two or more continuous characters are so specified.

The character image table 302 has images of the characters included in the keyword $K_w$ stored therein. The images of the characters are, for example, fonts in a bit map format.

The shape collation section 303 compares a feature amount of the area extracted by the character image extraction section 301 with a feature amount of an image of each of the characters included in the keyword $K_w$ stored in the character image table 302, and determines whether these two images are similar to each other or not.

The collation control section 304 controls the operation of the character shape search section 103.

An exemplary operation of the character shape search section 103 and controlled by the collation control section 304 will be described by steps S101 through S103. It is assumed that the candidate portion $SD_c$ is a collection of characters $SD_c[j]$. Each of the character $SD_c[j]$ has a data structure similar to that described above with reference to FIG. 2B. In steps S101 through S103, variable j represents an index of a character $SD_c[j]$, and variable i represents an index of a keyword $K_w[i]$.

A plurality of candidate portions $SD_c$ can exist in the character recognition result $D_c$. When a plurality of candidate portions $SD_c$ exist in the character recognition result $D_c$, the following steps S101 through S103 are performed for each of the candidate portions $SD_c$.

Step S101: Variable start_j is substituted for variable j, and a value "0" is substituted for variable i. Variable start_j is an index of the character located at a leading end (left end) of the candidate portion $SD_c$. In step S101, a list having an equal length to the length of the keyword $K_w$, i.e., $N_k$ is prepared as detection portion data.

Step S102: From the candidate portion $SD_c$, one character, or two or more continuous characters, to be corresponded to a keyword character $K_w[i]$ is specified as the non-matching character, and an image $C_i$ is extracted. This processing is executed by the character image extraction section 301, and will be described below in more detail with reference to FIG. 8. The image $C_i$ is an image of an area assigned to the one character or two or more continuous characters specified as the non-matching character. An image $KC_i$ of the keyword character $K_w[i]$ is obtained from the character image table 302.

Step S103: It is determined whether the keyword character $K_w[i]$ matches the non-matching character specified in step S102 or not. In order to determine this, the image $C_i$ and the image $KC_i$ are first collated with each other using the shape collation section 303. The collation of the images is performed by comparing the feature amounts of the images. An Euclid distance, between the feature amount of the image $C_i$ and the feature amount of the image $KC_i$, which is smaller than a prescribed threshold value $Thd_1$ indicates that the image $C_i$ and the image $KC_i$ are similar to each other. When the image $C_i$ and the image $KC_i$ are similar to each other, the non-matching character specified in step S102 is determined to match the keyword character $K_w[i]$.

When the non-matching character specified in step S102 is determined to match the keyword $K_w[i]$, a character $SD_c[j]$ is registered at the i'th location of the detection portion data. Variable i is incremented by 1, and variable next_j is substituted for variable j. Then, the procedure goes back to step S102. This means that the next character in the keyword is searched for from the portion, in the candidate portion $SD_c$, to the right of the character which has been collated. Variable next_j represents an index of the character immediately to the right of the character, in the candidate portion $SD_c$, which has been collated. The value of variable next_j is determined in step S102 by the character image extraction section 301.

When the non-matching character specified in step S102 is determined not to match the keyword $K_w[i]$, value "0" is substituted for variable i, variable start_j+1 is substituted for variable j, variable j is substituted for variable start_j, and the procedure goes back to step S102. This means that the character of interest in the candidate portion $SD_c$ is shifted to the right by one character and the first keyword character $K_w[0]$ is searched for.

When the images $KC_i$ of all the keyword characters included in the keyword $K_w$ are determined to be similar to the corresponding images $C_i$ by the processing of the step S101 through S103, the characters in the candidate $SD_c$ corresponding to the respective keyword characters included in the keyword $K_w$ are specified as the matching portion (second matching portion).

In this manner, the character shape search section 103 acts as a second matching portion specification section for determining whether or not at least one candidate portion $SD_c$ (first portion) includes at least one second matching portion which matches the keyword based on a comparison of a feature amount of the partial area of the image assigned to at least one second character (second character) included in at least one candidate portion $SD_c$ (first portion) with a feature amount of an image of at least one keyword character (first character) included in the keyword. When the at least one candidate portion $SD_c$ includes at least one such second matching portion, the character shape search section 103 specifies the at least one such second matching portion.

Figure 8:
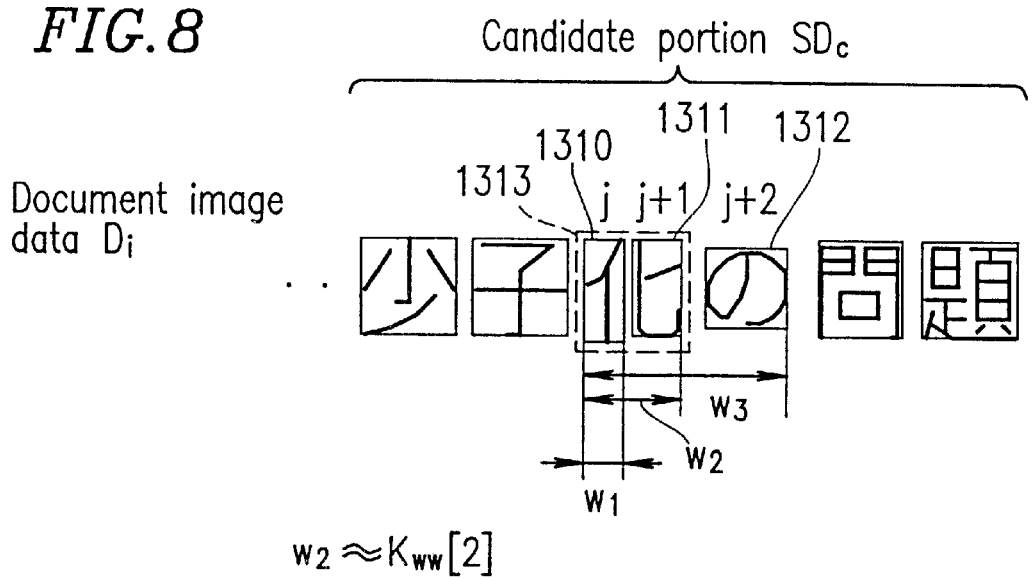
FIG. 8 shows an example of specification, performed by a character image extraction section 301 shown in FIG. 7, of a character in the candidate portion $SD_c$ corresponding to a specific character in the keyword $K_w$.

FIG. 8 shows an example of specification by the character image extraction section 301 of a character in the candidate portion $SD_c$ corresponding to a specific character in the keyword $K_w$.

It is assumed that the keyword $K_w$ is "少子化('shoshika')" and the document image data $D_i$ includes a portion " . . . ('shoshika no mondai') . . . ". Where collation of "少子('shoshi')" has been finished, collation of character "化('ka')" (=$K_w[2]$) in the keyword $K_w$ is now performed. Character "化('ka')" in the document image $D_i$ is divided into fractions "イ('i')" and "ヒ('hi')" due to a cut-out error occurred during the character recognition by the OCR device 202 (FIG. 1). A character $SD_c[j]$ and a character $SD_c[j+1]$ in the candidate portion $SD_c$ correspond to the fractions. Quadrangles 1310, 1311 and 1312 are partial areas in the document image data $D_i$ assigned to the characters $SD_c[j]$, $SD_c[j+1]$ and $SD_c[j+2]$.

In this example, the width of the quadrangle 1310 is $w_1$, the width of the area including the quadrangles 1310 and 1311 (quadrangle 1313) is $w_2$, and the width of the area including the quadrangles 1310 through 1312 is $w_3$.

The collation of character "化('ka')" in the keyword $K_w$ is performed as follows. An estimated character width $K_{ww}[2]$ of character "化('ka')" (=($K_w[2]$) is compared with each of widths $w_1$, $w_2$ and $w_3$. Assuming that width $w_2$ has the closest value to the estimated character width $K_{ww}[2]$ among the widths $w_1$, $w_2$ and $w_3$, the characters $SD_c[j]$ and $SD_c[j+1]$ are specified as the non-matching character.

The image of the quadrangle 1313 is extracted from the document image data $D_i$ as the character image $C_i$. The index [j+2] of the character immediately to the right of the two characters specified as the non-matching character (the characters $SD_c[j]$ and $SD_c[j+1]$) is determined as the value of variable next_j.

Figure 9:
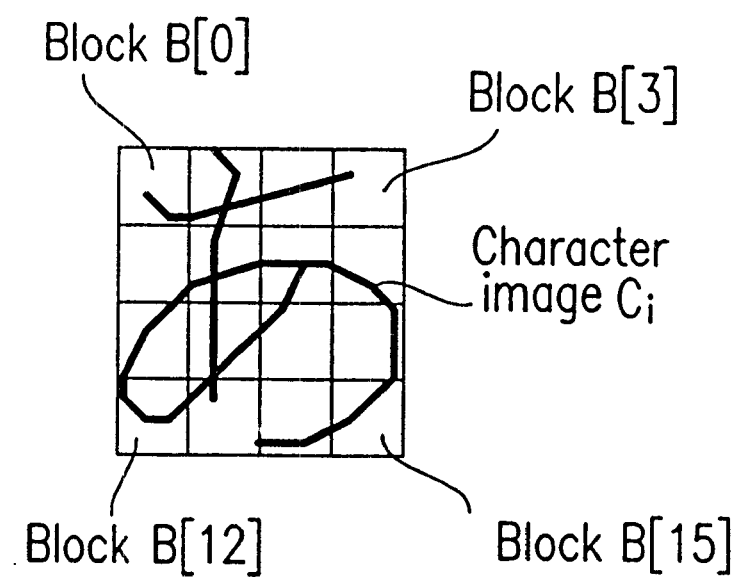
FIG. 9 shows an exemplary method for finding a feature amount (vector amount) from a character image $C_i$.

FIG. 9 shows an exemplary method for finding a feature amount (vector amount) from a character image $C_i$.

A character image $C_i$ of character "あ('a')" is divided into 16 blocks B[i] ($0 \leq i \leq 15$). The blocks are numbered from upper left to the lower right. The black pixel density of each of the blocks B[0] through B[15] is calculated. Thus, 16 values of the black pixel density are obtained. The black pixel density is found by dividing the number of black pixels in each block by the area of the block. A 16-dimensional vector amount having these 16 values as components is set as the feature amount. The feature amount obtained in this manner indicates the features of the character shape.

As described above, the document search device 1 (FIG. 4) according to the present invention first searches for a keyword based on the character codes by the text search section 101, and then searches for the keyword based on the feature amounts of the image. The search based on the feature amounts is performed from the portion having a higher possibility that a search omission occurred in the search performed by the text search section 101. Thus, the search omissions can be reduced.

Since the search based on the feature amounts is performed only in the portion having a higher possibility that a search omission occurs, the cost for the search (time and calculation amount) is kept relatively low.

In the above description, in the search based on the character codes performed by the text search section 101, the character code in a character in the character recognition result $D_c$ is simply compared with the character code of a character in the keyword $K_w$. Alternatively, each of the characters in the character recognition result $D_c$ obtained as a result of character recognition by the OCR device 202 (FIG. 1) can have a plurality of candidate characters. In this case, when the character code of one of the candidate characters matches the character code of a specific character in the keyword $K_w$, the character in the character recognition result $D_c$ can be determined as matching the specific character in the keyword $K_w$. Still alternatively, a plurality of similar characters can be prepared for a specific character in the keyword $K_w$. In this case, when the character code of one of the plurality of similar characters matches the character code of a character in the character recognition result $D_c$, the character in the character recognition result $D_c$ can be determined as matching the specific character in the keyword $K_w$.

As the method of search performed by the text search section 101, an unrestricted character search using a thesaurus or other dictionaries of words having similar meanings, or other methods of search are usable.

The document data $D_d$ can be data of an index format.

In the above description, the character image table 302 can use data in which the character code and the character image are matched, such as font data. Alternatively, the character image table 302 can use data obtained by collecting character images from the actual document image data for each character code and finding an average value of a feature amount of each character code. When there is a search result of the same keyword having a relatively high reliability degrees (for example, the search result $RD_{t1}$ (FIG. 4) obtained by the text search section 101), the character image table 302 can use pairs of character codes and character images created from the search result. When there is no such search result, the font data can be used.

The character width estimation section 104 can be eliminated. In that case, one same value can be used as the estimated character width regardless of the character (for example, an estimated character height value "a" can be used).

After the character specification section 102 performs the specification, the characters included in the candidate portion $SD_c$ can be combined or re-divided. In order to do such processing, a character re-division section can be further included in the document search device 1 (FIG. 4). The character re-division section combines the characters included in the candidate portion $SD_c$ specified by the character specification section 102 and extracts an image corresponding to the combined character from the document data $D_d$. The extracted image is divided into pieces as small as possible. When the characters are written horizontally, the division is performed in a portion where the projective histogram of black pixels obtained in the vertical direction is smaller than a predetermined threshold value. The pieces obtained by re-dividing the image as small as possible are referred to as the "fractionated elements". A fractionated element generally has a size equal to or smaller than each character in the candidate portion $SD_c$. In the above description, when the width of the non-matching character is determined by the character image extraction section 301, the width of the non-matching character is changed by increasing or decreasing the number of characters in the candidate portion $SD_c$ included in the non-matching character. Alternatively, the width of the non-matching character can be changed by increasing or decreasing the number of fractionated elements included in the non-matching character. When the fractionated element is utilized, even when a cut-out error occurs during the character recognition by the OCR device 202 (FIG. 1), an appropriate cut-out width can be specified based on the width of a keyword character.

Hereinafter, variations of the document search device 1 (FIG. 4) in the first example will be described with reference to figures.

Figure 10:
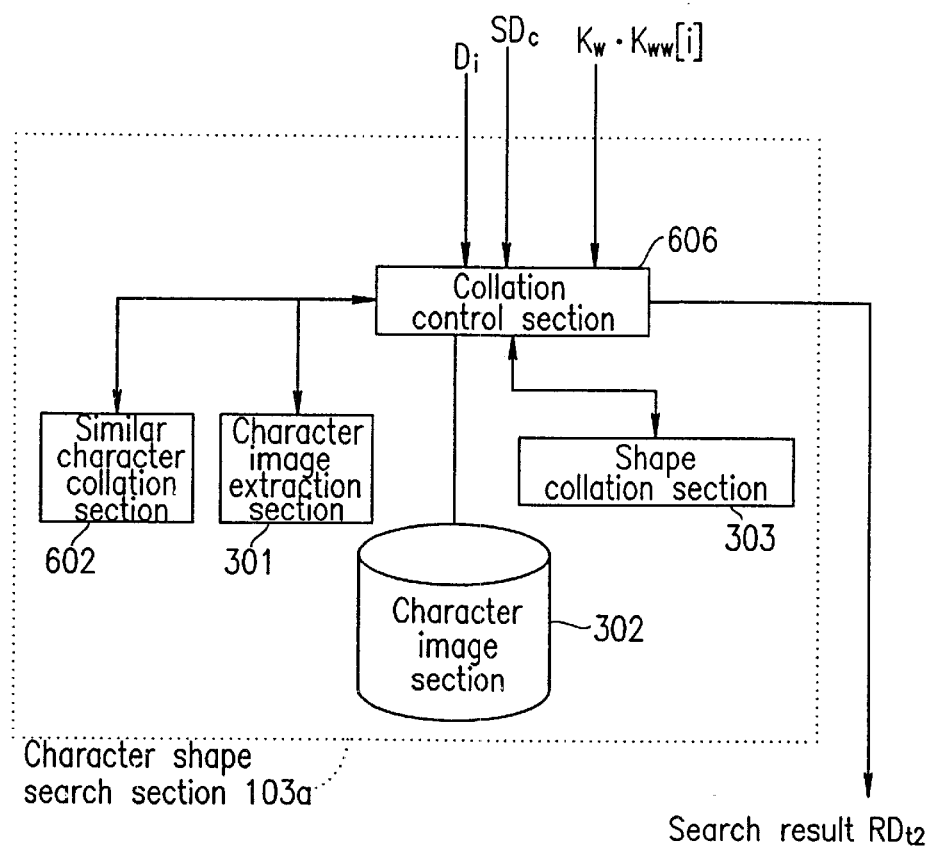
FIG. 10 is a block diagram illustrating a structure of a character shape search section 103a as a variation of the character shape search section 103 shown in FIG. 7.

FIG. 10 shows a structure of a character shape search section 103a as a variation of the character shape search section 103.

The character shape search section 103a is usable instead of the character shape search section 103 shown in FIG. 7. In FIG. 10, identical elements as those shown in FIG. 7 bear the same reference numerals and descriptions thereof will be omitted.

The character shape search section 103a includes a character image extraction section 301, a character image table 302, a shape collation section 303, a collation control section 606, and a similar character collation section 602.

The collation control section 606 controls the overall operation of the character shape search section 103a.

The similar character collation section 602 determines whether a character code $C_c[j]$ of a character included in the candidate portion $SD_c$ matches the character code of a keyword character $K_w[i]$ or not. The similar character collation section 602 can alternatively determine whether the character code $C_c[j]$ matches the character code of either one of the characters included in a similar character list (FIG. 24B) regarding the keyword character $K_w[i]$. Such a similar character list is prepared for all the characters in advance and lists characters which may be mistakenly recognized as a specific character at a relatively high possibility.

An exemplary operation of the character shape search section 103a and controlled by the collation control section 606 will be described by steps S301 through S303. It is assumed that the candidate portion $SD_c$ is a collection of characters $SD_c[j]$. Each of the character $SD_c[j]$ has a data structure similar to that described above with reference to FIG. 2B. In steps S301 through S303, variable j represents an index of a character $SD_c[j]$, and variable i represents an index of a keyword $K_w[i]$.

A plurality of candidate portions $SD_c$ can exist in the character recognition result $D_c$. When a plurality of candidate portions $SD_c$ exist in the character recognition result $D_c$, the following steps S301 through S303 are performed for each of the candidate portions $SD_c$.

Step S301: Variable start_j is substituted for variable j, and a value "0" is substituted for variable i. Variable start_j is an index of the character located at a leading end (left end) of the candidate portion $SD_c$. In step S301, a list having an equal length to the length of the keyword $K_w$, i.e., $N_k$ is prepared as detection portion data.

Step S302: It is determined whether the character $SD_c[j]$ matches the keyword $K_w[i]$ or not by the similar character collation section 602 based on the comparison of the character codes.

When they match each other, the character $SD_c[j]$ is registered at the i'th location of the detection portion data. Variables i and j are both incremented by 1, and the processing in step S302 is repeated. This means that the next character in the candidate portion $SD_c$ is collated with the next keyword character.

When the character $SD_c[j]$ does not match the keyword $K_w[i]$ the processing goes to step S303.

In this manner, the similar character collation section 602 acts as a first determination section for determining whether or not the character code of at least one character (second character) included in the at least one candidate portion $SD_c$ (first portion) matches the character code of a specific keyword character $K_w[i]$ (first character) included in the keyword.

Step S303: From the candidate portion $SD_c$, one character, or two or more continuous characters, to be corresponded to the keyword character $K_w[i]$ is specified as the non-matching character, and an image $C_i$ is extracted. This processing is executed by the character image extraction section 301, and described above in detail with reference to FIG. 8. An image $KC_i$ of the keyword character $K_w[i]$ is obtained from the character image table 302.

Then, it is determined whether or not the keyword character $K_w[i]$ matches the non-matching character specified above. In order to determine this, the image $C_i$ and the image $KC_i$ are first collated with each other using the shape collation section 303. The collation of the images is performed by comparing the feature amounts of the images. An Euclid distance, between the feature amount of the image $C_i$ and the feature amount of the image $KC_i$, which is smaller than a prescribed threshold value $Thd_1$ indicates that the image $C_i$ and the image $KC_i$ are similar to each other. When the image $C_i$ and the image $KC_i$ are similar to each other, the non-matching character specified in step S303 is determined to match the keyword $K_w[i]$.

When the non-matching character specified in step S303 is determined to match the keyword $K_w[i]$, the one character, or two or more characters, specified as the non-matching character are registered at the i'th location of the detection portion data. Variable i is incremented by 1, and variable next_j is substituted for variable j. Then, the procedure goes back to step S302. This means that the next character in the keyword is searched for from the portion, in the candidate portion $SD_c$, to the right of the character which has been collated. Variable next_j represents an index of the character immediately to the right of the character, in the candidate portion $SD_c$, which has been collated. The value of variable next_j is determined in step S303 by the character image extraction section 301.

When the non-matching character specified in step S303 is determined not to match the keyword $K_w[i]$, a value "0" is substituted for variable i, variable start_j+1 is substituted for variable j, variable j is substituted for variable start_j, and the procedure goes back to step S302. This means that the character of interest in the candidate portion $SD_c$ is shifted to the right by one character and the first keyword character $K_w[0]$ is searched for.

In this manner, the character image extraction section 301 acts as a non-matching character specification section. Specifically, when the character code of a specific character $SD_c[j]$ (second character) included in at least one candidate portion $SD_c$ (first portion) does not match the character code of a specific keyword character $K_w[i]$ (first character) included in the keyword $K_w$, the character image extraction section 301 specifies one character, or two or more continuous characters, which include at least the specific character $SD_c[j]$ (second character) included in the at least one candidate portion $SD_c$ (first portion) and has a width closest to a width of the specific keyword character $K_w[i]$ (first character) as a non-matching character.

The shape collation section 303 acts as a second determination section. Specifically, when a distance between a feature amount of an image of the specific keyword character $K_w[i]$ (first character) and a feature amount of an image of an area including one partial area or two or more partial areas assigned to one second character or two or more continuous characters (second characters) included in the non-matching character is smaller than a prescribed value, the shape collation section 303 determines that the specific keyword character $K_w[i]$ matches the non-matching character.

As compared to the procedure in steps S101 through S103, the procedure in steps S301 through S303 additionally includes the collation based on the comparison of the character codes (step S302) performed before the collation based on the comparison of the feature amount of the images (step S303). When the character $SD_c[j]$ in the candidate portion $SD_c$ is determined to match the keyword character $K_w[i]$ by the collation based on the comparison of the character codes, the collation based on the comparison of the feature amounts of the images is not performed. Since the collation based on the comparison of the character codes can generally be performed at a higher speed than the collation based on the comparison the feature amounts of the images, the processing speed of the search by the document search device 1 (FIG. 4) can be raised by the processing of steps S301 through S303.

In step S303, in the case where the reliability degree $C_r[j]$ of the character $SD_c[j]$ in the candidate portion $SD_c$ is higher than a prescribed threshold value, the collation by the shape collation section 303 can be omitted. The reason is that the reliability degree $C_r[j]$ higher than the prescribed threshold value indicates that there is a high possibility that the character recognition of the OCR device 202 (FIG. 1) has been done correctly; i.e., the possibility that the comparison of the feature amounts of the images is required is low.

Figure 11:
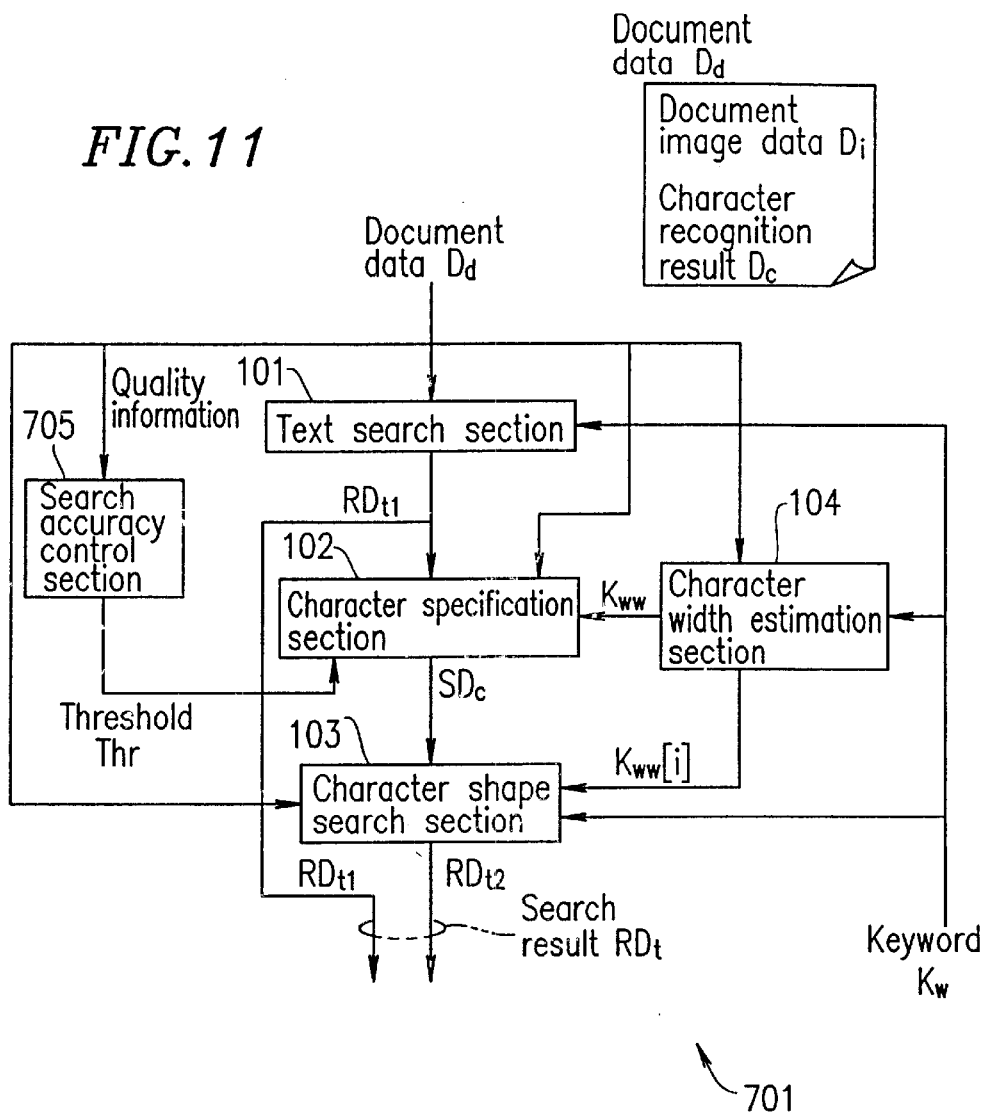
FIG. 11 is a block diagram illustrating a structure of a document search device 701 as a variation of the document search device 1 shown in FIG. 4.

FIG. 11 shows a structure of a document search device 701 as a variation of the document search device 1 (FIG. 4). The document search device 701 is usable, for example, instead of the document search device 1.

In FIG. 11, identical elements as those shown in FIG. 4 bear the same reference numerals and descriptions thereof will be omitted.

The document search device 701 includes a search accuracy control section 705 in addition to the elements in the document search device 1. The search accuracy control section 705 generates a threshold value Thr used by the character specification section 102.

It is assumed that the document data $D_d$ input to the document search device 701 includes quality information. The quality information is a value regarding the image quality of the document image data $D_i$ and represents, for example, the resolution, degree of color fading of characters, and degree of smudging characters in the document image data $D_i$. The quality information is represented by, for example, a value between 0 and 1. As the value is greater, the image quality of the document image data $D_i$ is better.

The search accuracy control section 705 outputs the threshold value Thr in accordance with the quality information regarding the document data $D_d$ based on a table which defines the relationship between the quality information and the threshold value Thr. According to an exemplary usable relationship, the quality information and the threshold value are equal to each other.

Generally, when the image quality of the document image data $D_i$ is relatively high, the character recognition of the OCR device 202 (FIG. 1) is expected to be performed accurately. Accordingly, the number of the candidate portions $SD_c$ specified by the character specification section 102 can be adjusted by adjusting the threshold value Thr in accordance with the image quality of the document image data $D_i$. Thus, when the quality of the document data $D_d$ is relatively high, the number of the candidate portions $SD_c$ to be processed by the character shape search section 103 can be prevented from being unnecessarily increased. When the quality of the document data $D_d$ is relatively low, the number of the candidate portions $SD_c$ to be processed by the character shape search section 103 is increased, so that the search omissions caused by a cut-out error or a recognition error of the OCR device 202 (FIG. 1) can be reduced.

Figure 12:
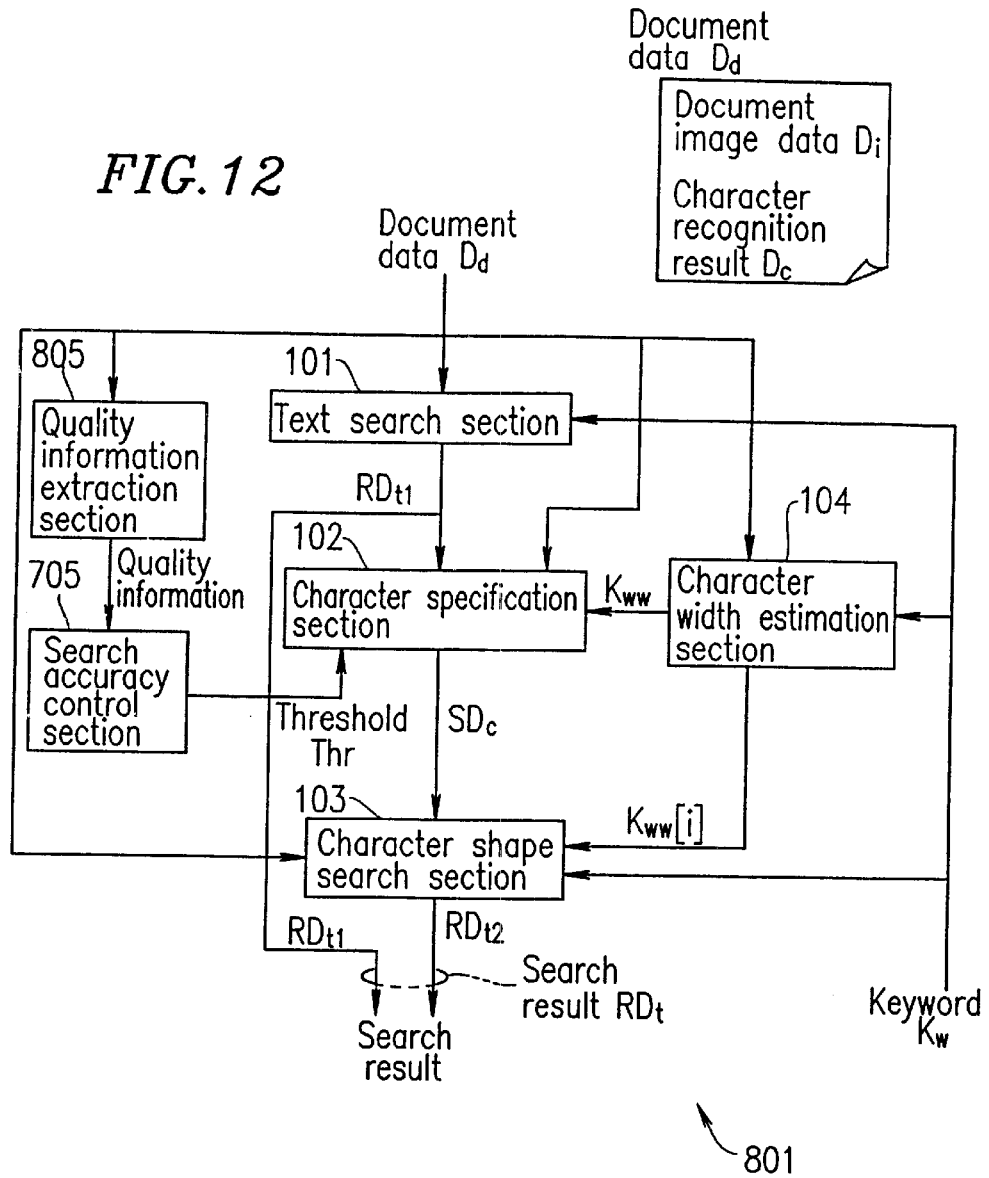
FIG. 12 is a block diagram illustrating a structure of a document search device 801 as a variation of the document search device 701 shown in FIG. 11.

FIG. 12 shows a structure of a document search device 801 as a variation of the document search device 701 (FIG. 11). The document search device 801 is usable, for example, instead of the document search device 701.

In FIG. 12, identical elements as those shown in FIG. 11 bear the same reference numerals and descriptions thereof will be omitted.

The document search device 801 includes a quality information extraction section 805 in addition to the elements in the document search device 701. The quality information extraction section 805 finds quality information on the document data $D_d$ from the reliability degree assigned to a character in the character recognition result $D_c$.

The reliability degree $C_r[j]$ reflects the probability at which the character recognition is performed correctly. As the quality is higher, the probability at which the character recognition is performed correctly is higher. Accordingly, the quality information can be obtained from the reliability degree $C_r[j]$.

The quality information extraction section 805 can find the quality information as, for example, an average value of the reliability degrees $C_r[j]$ of all the characters included in the character recognition result $D_c$ of the document data $D_d$.

Due to the structure shown in FIG. 12, the quality information can be objectively found based on the reliability degree of the characters included in the document data $D_d$.

Figure 13:
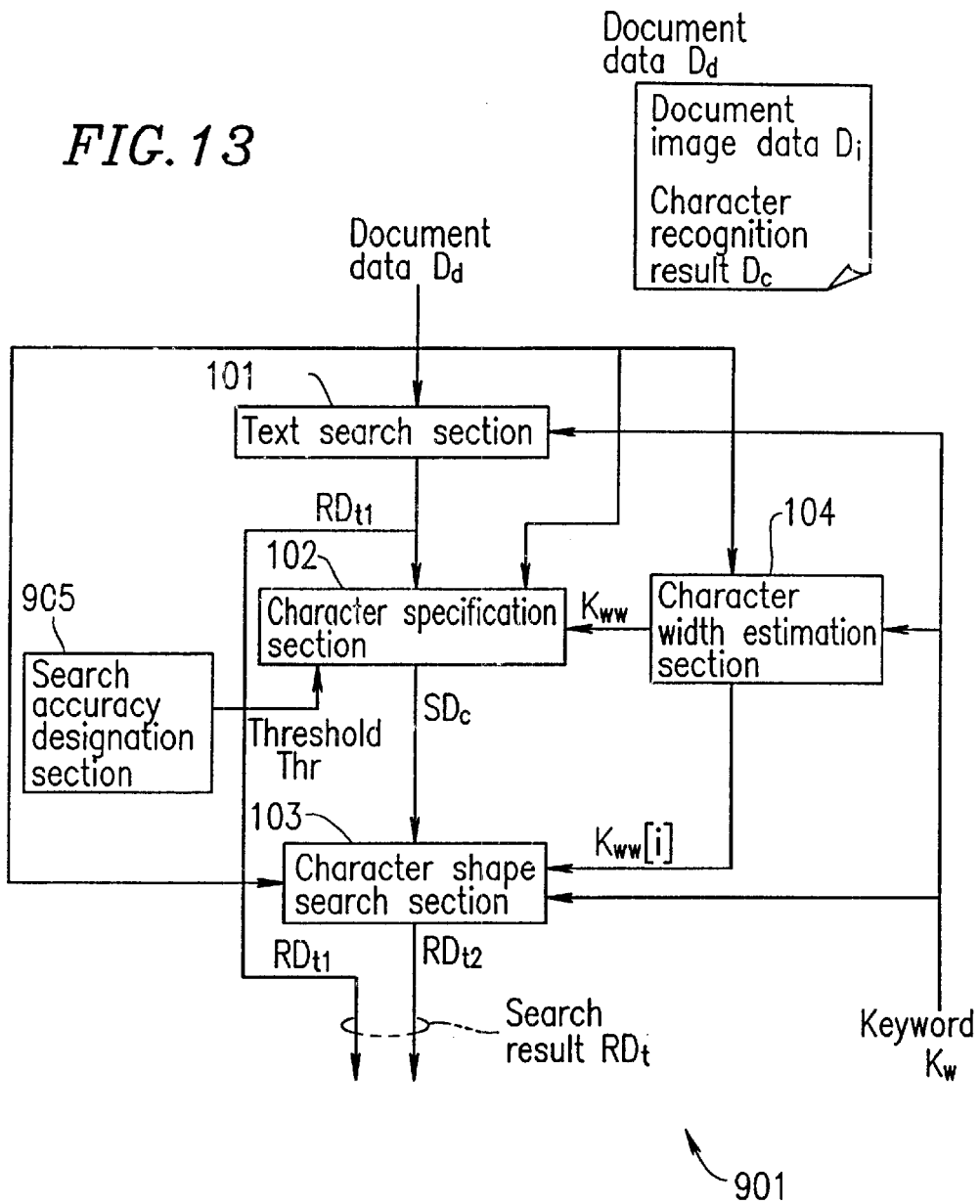
FIG. 13 is a block diagram illustrating a structure of a document search device 901 as a variation of the document search device 701 shown in FIG. 11.

FIG. 13 shows a structure of a document search device 901 as a variation of the document search device 701 (FIG. 11). The document search device 901 is usable, for example, instead of the document search device 701.

In FIG. 13, identical elements as those shown in FIG. 11 bear the same reference numerals and descriptions thereof will be omitted.

The document search device 901 includes a search accuracy designation section 905 instead of the search accuracy control section 705 in FIG. 11. The search accuracy designation section 905 allows a user to designate a threshold value Thr used by the character specification section 102.

The designation section 905 allows the user to designate a threshold value Thr in accordance with the purpose of use. When the user needs to know as many correct detection portions as possible and does not care about increasing the number of excessive detection portions, the threshold value Thr can be set to a large value. When the user considers one correct detection portion is sufficient and does not want to increase the number of excessive detection portions, the threshold value Thr can be set to a small value. The "excessive detection portion" is defined as a portion which does not match the keyword in the original document but is detected as a matching portion by the document search device 901.

Thus, the document search device 901 allows the user to perform a search as intended by the user.

Figure 14:
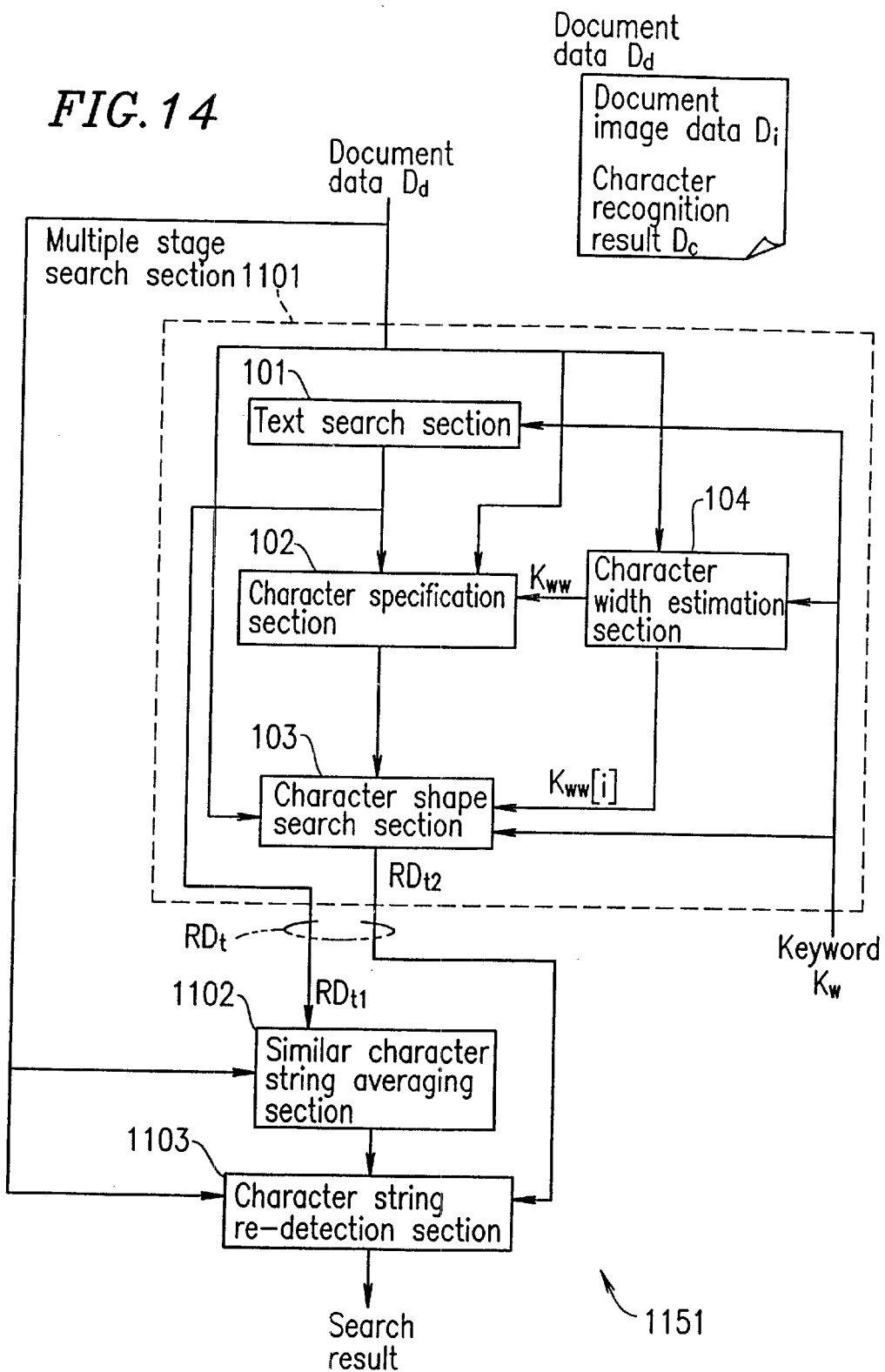
FIG. 14 is a block diagram illustrating a structure of a document search device 1151 as a variation of the document search device 1 shown in FIG. 4.

FIG. 14 shows a structure of a document search device 1151 as a variation of the document search device 1 (FIG. 4). The document search device 1151 is usable, for example, instead of the document search device 1.

In FIG. 14, identical elements as those shown in FIG. 4 bear the same reference numerals and descriptions thereof will be omitted.

The document search device 1151 includes a similar character string averaging section 1102 for finding an average value of feature amounts of images from the detection portion data included in a first search result $RD_{r1}$, i.e., a collection of first matching portions, and a character string re-detection section 1103 for refining the detection portion data included in a second search result $RD_{r2}$, i.e., collection of second matching portions, using the average value of the feature amount of the images found by the similar character string averaging section 1102.

The number of excessive detection portions included in the first search result $RD_{r1}$ obtained by the search of the text search section 101 is considered to be smaller than the number of excessive detection portions included in the second search result $RD_{r2}$ obtained by the search of the character shape search section 103. Accordingly, the possibility that the detection portion data included in the first search result $RD_{r1}$ truly matches the keyword $K_w$ is high.

The similar character string averaging section 1102 refers to the detection portion data included in the first search result $RD_{r1}$ to extract a character image $C_i$ of the area, of the document image data $D_i$, corresponding to each of the keyword characters included in a keyword $K_w$. The character image $C_i$ indicates in which shape each keyword character is written in the original document. The similar character string averaging section 1102 then calculates a feature amount of each extracted character image $C_i$ and averages the feature amounts of the keyword characters of the keyword $K_w$. The averaged feature amount is used as a determination reference value by the character string re-detection section 1103.

In this manner, the similar character string averaging section 1102 acts as a calculation section for calculating a prescribed determination reference value from the search result $RD_{r1}$ (at least one first matching portion).

The detection portion data included in the second search result $RD_{r2}$ obtained by the character shape search section 103 may possibly include an excessive detection portion or portions. The reason is that the character shape search section 103 may possibly use a character image different from the font used in the original document, for performing a search.

The character string re-detection section 1103 screens out such an excessive detection portion or portions using the averaged feature amount (determination reference value) found by the similar character string averaging section 1102.

Specifically, the character string re-detection section 1103 refers to the detection portion data included in the second search result $RD_{r2}$ to extract a character image $C_i$ of the area, in the document image data $D_i$, corresponding to each of the keyword characters. Then, the character string re-detection section 1103 detects detection portion data according to which the distance between the feature amount of the extracted character image $C_i$ and the determination reference value is smaller than a prescribed threshold value $Thd_2$.

In this manner, the character string re-detection section 1103 acts as a detection section for detecting a second matching portion which fulfills a prescribed second condition among the search results $RD_{r2}$ (at least one second matching portion) based on the prescribed determination reference value.

The detection portion data detected by the character string re-detection section 1103 is output as a new collection of the detection portion data.

In the case where a search is performed again in the document data $D_d$ using the averaged feature amount (determination reference value) found by the similar character string averaging section 1102, the search accuracy can be further raised.

As described above, the document search device 1151 can restrict the number of the excessive detection portions by detecting detection portion data which fulfills a prescribed condition based on a determination reference value from detection portion data included in the second search result $RD_{r2}$ having a relatively low reliability degree.

The multiple stage search section 1101 indicated with broken line in FIG. 14 corresponds to the document search device 1 (FIG. 4) in the above-described example. The multiple stage search section 1101 can have any other structure which can control the number of the excessive detection portions included in a search result step by step.

The search result obtained by the multiple stage search section 1101 includes search results $RD_{r1}$, $RD_{r2}$, ... $RD_{rm}$. Where the search result $RD_{r1}$ includes the smallest number of excessive detection portions, the similar character string averaging section 1102 finds the determination reference value based on the search result $RD_{r1}$.

Instead of including the multiple stage search section 1101, a document search device can have a structure which does not control the number of excessive detection portions included in a search result step by step. Such an example is shown in FIG. 15.

Figure 15:
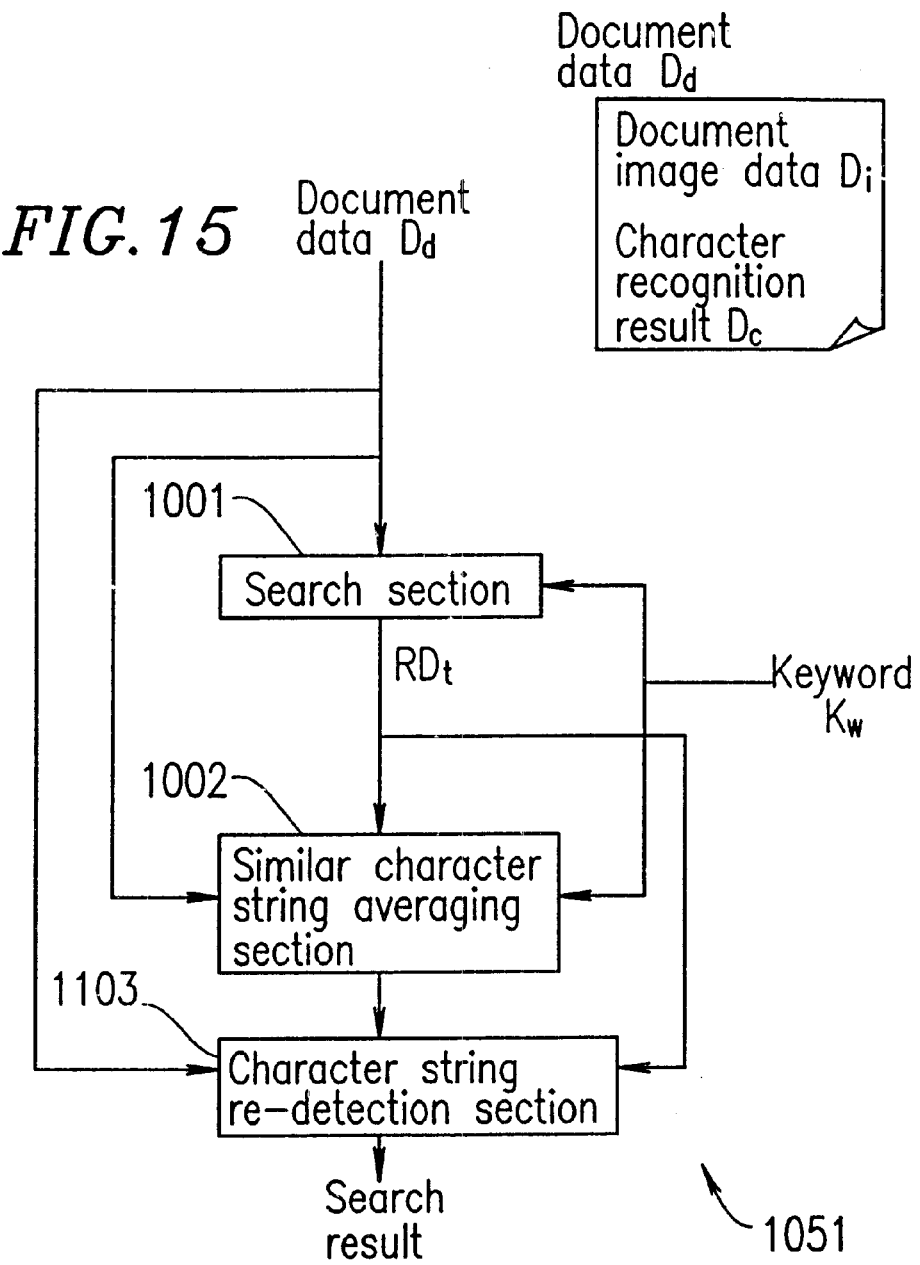
FIG. 15 is a block diagram illustrating a structure of a document search device 1051 as a variation of the document search device 1151 shown in FIG. 14.

FIG. 15 shows a structure of a document search device 1051 as a variation of the document search device 1151 (FIG. 14). The document search device 1051 is usable, for example, instead of the document search device 1151.

In FIG. 15, identical elements as those shown in FIG. 14 bear the same reference numerals and descriptions thereof will be omitted.

The document search device 1051 includes a search section 1001, a similar character string averaging section 1002, and a character string re-detection section 1103.

The search section 1001 can be any document search section. The search result obtained by the search section 1001 is output as a search result $RD_r$.

The similar character string averaging section 1002 refers to data on at least one detection portion similar to the keyword $K_w$ in the search result $RD_r$ to extract a character image $C_i$ of an area, of the document image data $D_i$, corresponding to each of the keyword characters in a keyword $K_w$. The character image $C_i$ indicates in which shape each keyword character is written in the original document. The similar character string averaging section 1002 then calculates a feature amount of each extracted character image $C_i$ and averages the feature amounts of the keyword characters of the keyword $K_w$. The averaged feature amount is used as a determination reference value by the character string re-detection section 1103.

The similar character string averaging section 1002 finds at least one detection portion similar to the keyword $K_w$ in the search result $RD_r$ as follows.

First, an image of each of the keyword characters included in the keyword $K_w$ is created to provide a character image $KC_i$. In the case where the character block data $D_t$ has the information on the font used in the character block, the same font is used when creating the image of the keyword characters.

The feature amount is obtained from the character image $KC_i$. As the feature amount, a feature amount used in character recognition or the feature described above with reference to FIG. 9 are, for example, used. Then, referring to the information on the position of the character, in the character recognition result $D_c$, corresponding to each of the characters included in the keyword $K_w$, the character image $C_i$ is extracted from the document image data $D_i$. The Euclid distance between the feature amount obtained from the character image $KC_i$ and the feature amount obtained from the character image $C_i$ is calculated. The Euclid distance is calculated regarding all the keyword characters included in the keyword $K_w$. The value obtained by dividing the sum of the Euclid distances by the number of characters included in the keyword $K_w$ is defined as the distance between the detection portion data and the keyword $K_w$. As the distance is shorter, the detection portion data and the keyword $K_w$ are more similar to each other.

As described above, the distance between each of the detection portions included in the search result $RD_r$ from the keyword $K_w$, and a prescribed number of detection portions are selected. A detection portion having the shorter such distance is first selected, a detection portion having the second shortest such distance is next selected, and so on. Thus, at least one detection portion similar to the keyword $K_w$ is obtained.

EXAMPLE 2

Figure 16:
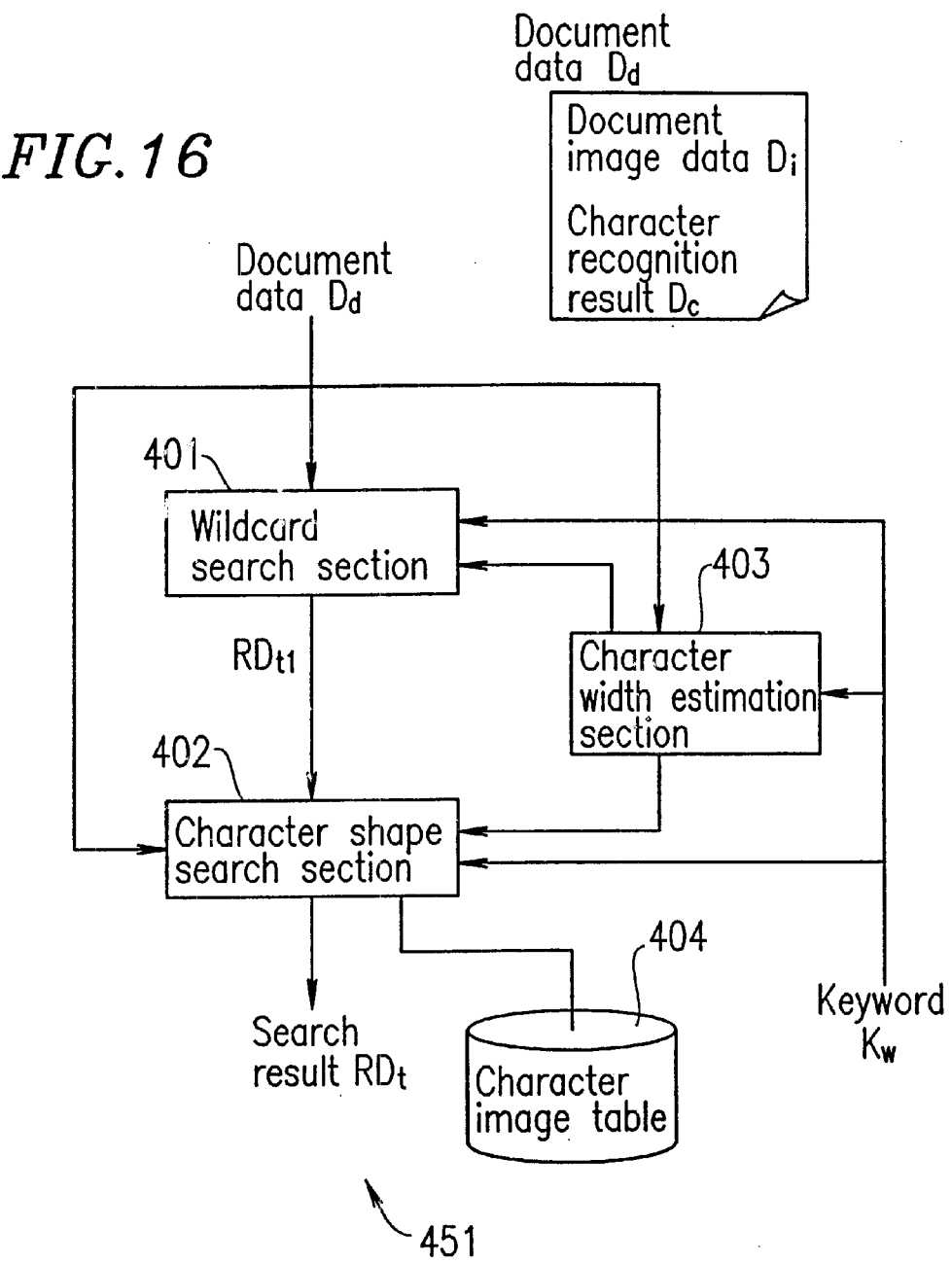
FIG. 16 is a block diagram illustrating a structure of a document search device 451 in a second example according to the present invention.

FIG. 16 shows a structure of a document search device 451 in a second example according to the present invention.

The document search device 451 includes a wildcard search section 401, a character shape search section 402, a character width estimation section 403, and a character image table 404.

The document search device 451 is usable as the document search device 204 shown in FIG. 1. In this case, the document search device 451 searches for a keyword $K_w$ in the document data $D_d$ accumulated in the document data base 203. The document data $D_d$ includes document image data $D_i$ and a character recognition result $D_c$.

The wildcard search section 401 compares a character code assigned to a keyword character included in the keyword $K_w$ (first character) with a character code assigned to a character included in the character recognition result $D_c$ (second character). The wildcard search section 401 specifies a portion where at least one character match and outputs this as a search result $RD_{r1}$. The search result $RD_{r1}$ includes detection portion data $RD_r[t]$, where $0 \leq t \leq (N_{ri}-1)$. The detection portion data $RD_t[t]$ indicates a matching portion which is at least one keyword character matching a character included in the character recognition result $D_c$ as a result of the comparison of the character codes.

The character shape search section 402 specifies a keyword character which does not match a character at the corresponding location in the detection portion data $Rd_t[t]$ (wildcard character) as a result of the comparison of the character codes. Then, the character shape search section 402 determines whether the wildcard character matches a character included in the character recognition result $D_c$ based on the comparison of the feature amounts of the images.

The character width estimation section 403 calculates an estimated character width of each keyword character. The estimated character width is used by the wildcard search section 401 and the character shape search section 402.

The character image table 404 is similar to the character image table 302 shown in FIG. 7 and will not be described in detail here.

FIG. 17 is a flowchart illustrating processing performed by the wildcard search section 401. Hereinafter, the processing in each step will be described.

Step S1701: Value "0" is substituted for variable i. Variable i is an index indicating the position of a keyword character in the keyword $K_w$. The substitution of a value "0" for variable i means that the processing starts with the first keyword character sequentially.

Step S1702: It is determined whether variable i is equal to variable $N_k$ or not. Variable $N_k$ indicates the number of keyword characters in the keyword $K_w$. When it is determined "Yes" in step S1702, the procedure is terminated. The reason is that when variable i is equal to variable $N_k$, the processing of all the keyword characters of the keyword $K_w$ is completed to the last keyword character. When it is determined "No" in step S1702, the procedure goes to step S1703.

Step S1703: Value "0" is substituted for variable j. Variable j is an index indicating the position of a character in the character recognition result $D_c$. The substitution of a value "0" for variable j means that the processing starts with the first character in the character recognition result $D_c$, sequentially.

Step S1704: It is determined whether variable j is equal to variable $N_d$ or not. Variable $N_d$ indicates the number of characters in the character recognition result $D_c$. When it is determined "Yes" in step S1704, the procedure goes to step S1708. The reason is that when variable j is equal to variable $N_d$, the processing of all the characters in the character recognition result $D_c$ is completed to the last character. When it is determined "No" in step S1704, the procedure goes to step S1705.

Step S1705: It is determined whether $K_w[i]$ is equal to $C_c[j]$ or not. $K_w[i]$ indicates the character code of the i'th character in the keyword $K_w$. $C_c[j]$ indicates the character code of the j'th character in the character recognition result $D_c$. With it is determined "Yes" in step S1705, the procedure goes to step S1706. When it is determined "No" in step S1705, the procedure goes to step S1707.

In this manner, the wildcard search section 401 acts as a first determination section for determining whether or not at least one keyword $K_w$ matches at least a part of the character recognition result $D_c$ by a comparison of the character codes in step S1705.

Step S1706: A character $D_c[j]$ is registered at the i'th location of the detection portion data. The detection portion data is a list having a length of $N_k$ as described above with reference to FIG. 2D. The character $D_c[j]$ is registered as the i'th element of the list. The detailed processing of step S1706 will be described below with reference to FIG. 19.

Step S1707: Variable j is incremented by 1. This means that the same procedure is performed for the next character in the character recognition result $D_c$.

Step S1708: Variable i is incremented by 1. This means that the same procedure is performed for the next keyword character in the keyword $K_w$.

FIG. 18 shows the search result $RD_{t1}$ found by the processing shown in FIG. 17. In this example, the keyword $K_w$ is "琵琶湖 ('biwako')". The character codes of all the keyword characters included in the keyword $K_w$ match the character codes of the characters in the detection portion data $RD_t[1]$. The character codes of some, but not all, of the keyword characters included in the keyword $K_w$ match the character codes of the characters in the detection portion data $RD_t[0]$. A list element 1861 represented by "*" in the detection portion data $RD_t[0]$ indicates that the character in the detection portion data $RD_t[0]$ at a location corresponding to that of the keyword character $K_w[2]$ (="湖 ('ko')") does not have a character code which matches the character code of the keyword character, and thus the character(s) in the character recognition result $D_c$ corresponding to the keyword $K_w[2]$ is unfixed. Such a list element is referred to as the "wildcard".

Figure 19:
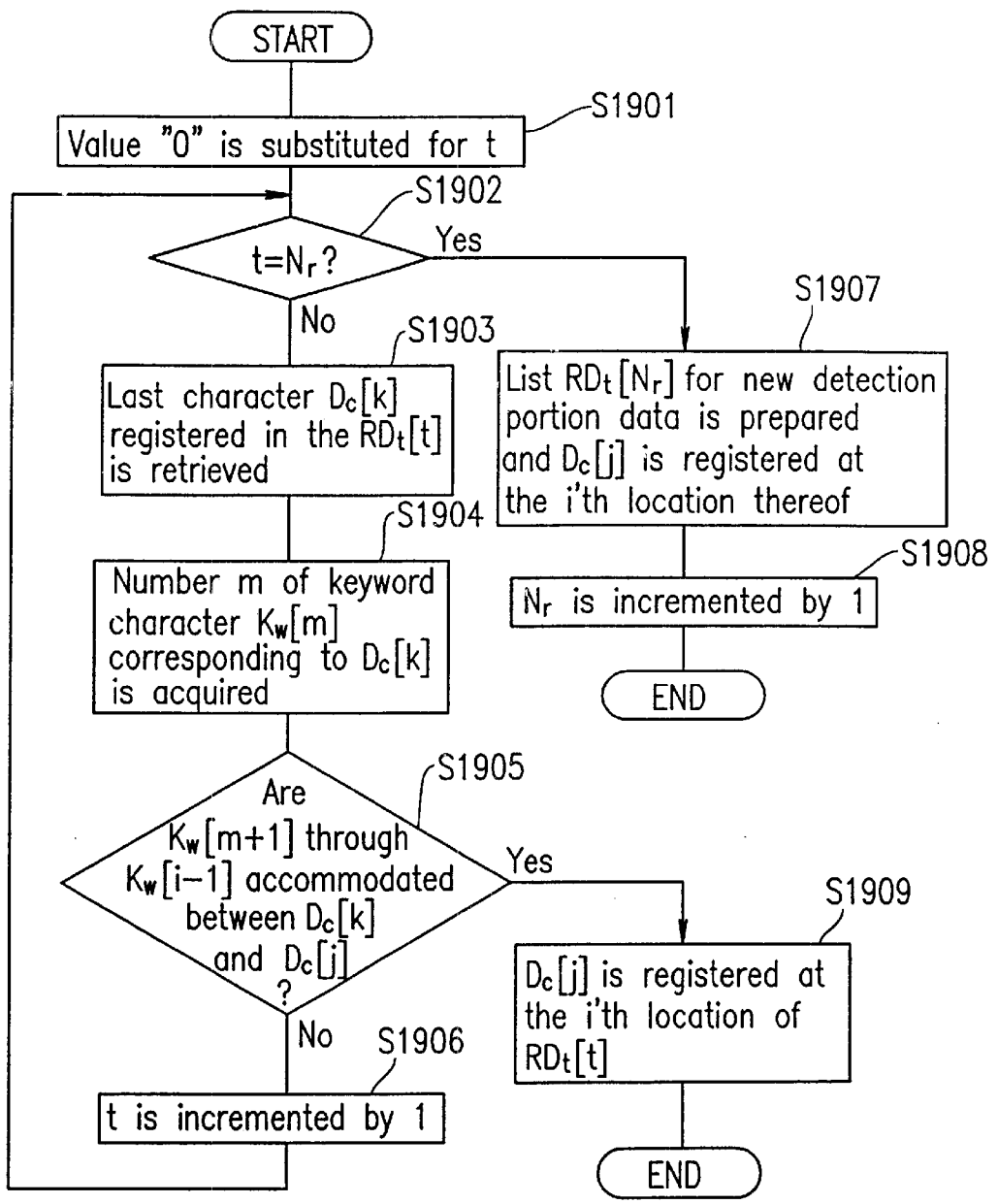
FIG. 19 is a flowchart illustrating a detailed operation procedure of the processing performed in step S1706 shown in FIG. 17.

FIG. 19 is a flowchart illustrating the processing in step S1706 in more detail. Hereinafter, the processing in each step will be described.

Step S1901: Value "0" is substituted for variable t. Variable t is an index of the detection portion data.

Step S1902: It is determined whether variable t is equal to variable $N_r$ or not. $N_r$ indicates the number of detection portion data which have been detected so far. When it is determined "Yes" in step S1902, the procedure goes to step S1907. The reason is that when variable t is equal to variable $N_r$, there is no detection portion data detected so far in which a character $D_c[j]$ can be registered. When it is determined "No" in step S1902, the procedure goes to step S1903.

Step S1903: The last character $D_c[k]$ registered in the detection portion data $RD_t[t]$ is retrieved.

Step S1904: An index m of the keyword character $K_w[m]$ corresponding to the character $D_c[k]$ is acquired. The index m is acquired by checking at which position the character $D_c[k]$ has been registered in the detection portion data $RD_t[t]$.

Step S1905: It is determined whether or not the keyword characters $K_w[m+1]$ through $K_w[i-1]$ can be accommodated between the character $D_c[k]$ and the character $D_c[j]$ without any overflow or any vacancy. Such a determination is done by determining whether or not the space between the character $D_c[k]$ and the character $D_c[j]$ is in the range of 1 to 1.2 times the width of the keyword characters $K_w[m+1]$ through $K_w[i-1]$. This range can be variable in accordance with the width of the inter-character spaces.

When it is determined "Yes" in step S1905, the procedure goes to step S1909. The reason is that when "Yes" in step S1905, the character $D_c[j]$ can be registered in the detection portion data $RD_t[t]$.

When it is determined "No" in step S1905, the procedure goes to step S1906.

Step S1906: Variable t is incremented by 1. This means that the next detection portion is processed without registering the character $D_c[j]$ in the detection portion data $RD_t[t]$.

Step S1907: A list $RD_t[N_r]$ for a new detection portion is prepared and the character $D_c[j]$ is registered at the i'th location of the new detection portion. The list elements in the prepared list $RD_t[N_r]$ other than the list element at the i'th location are wildcards at this point.

Step S1908: Variable $N_r$ is incremented by 1.

Step S1909: The character $D_c[j]$ is registered at the i'th location of the detection portion data $RD_t[t]$.

Hereinafter, with reference to FIGS. 20A and 20B, an example of a search for the keyword $K_w$ in the character recognition result $D_c$ performed in accordance with the processing showing in FIG. 19 will be described. The character recognition result $D_c$ has a data structure shown in FIG. 2B, and the keyword $K_w$ is "琵琶湖畔 ('biwakohan')".

It is assumed that "琵琶湖 ('biwako')" among "琵琶湖畔 ('biwakohan')" have been processed, and now the keyword character "畔 ('han')" ($K_w[3]$, i=3) is processed.

FIG. 20A shows the state of the detection portion data $RD_t[0]$ when the collation regarding "琵琶湖 ('biwako')" has been completed. Among the characters "琵琶湖 ('biwako')" which have been processed, the character recognition result $D_c$ includes characters having character codes matching those of "夕 ('biwa')" ($D_c[0]$ and $D_c[1]$). The character in the detection portion data $RD_t[0]$ at the location corresponding to that of the keyword character "湖 ('ko')" does not have a character code which matches the character code of "湖 ('ko')", and thus the character(s) in the character recognition result $D_c$ corresponding to the keyword character "湖 ('ko')" is unfixed. Regarding the keyword character "畔 ('han')", it has not been determined whether the character recognition result $D_c$ includes a character having a character code matching that of "畔 ('han')", and thus the correspondence between the keyword $K_w$ and the character recognition result $D_c$ has not been fixed yet. Such a determination is performed in step S1705 (FIG. 17).

It is assumed that variable j=5. In step S1705, the character code $C_c[5]$ of the character $D_c[5]$ is equal to the character code of the keyword character "畔 ('han')" ($K_w[3]$). Accordingly, the procedure goes to step S1706. The detailed processing in step S1706 is shown in FIG. 19.

It is assumed that variable t=0. In step S1903, the last character $D_c[k]$ registered in the detection portion data $RD_t[0]$ is the character $D_c[1]$ indicated with reference numeral 2602 in FIG. 20A. Accordingly, k=1.

In step S1904, the keyword character corresponding to the character $D_c[1]$ in the detection portion data $RD_t[0]$ is the keyword $K_w[1]$. Accordingly, m=1.

In step S1905, it is determined whether or not the keyword characters $K_w[m+1]$ through $K_w[i-1]$ (in this case, keyword character $K_w[2]$) can be accommodated in the space between the character $D_c[1(=k)]$ and the character $D_c[5(=j)]$ without any overflow or any vacancy. The space between the character $D_c[1(=k)]$ and the character $D_c[5(=j)]$ is 131 (see FIG. 2B, obtained as the difference between the x coordinate 318 at the lower right corner of the character $D_c[1]$ and the x coordinate 449 at the upper left corner of the character $D_c[5]$). The width of the keyword character $K_w[2]$ is found by the character width estimation section 403 (FIG. 16) as described with reference to FIG. 5. It is assumed that the width of the keyword character $K_w[2]$ is 125. Since 125<131<125×1.2 (=150), it is determined that the keyword character $K_w[2]$ is accommodated in the space between the character $D_c[1]$ and the character $D_c[5]$ without any overflow or any vacancy. Thus, the procedure goes to step S1909.

In step S1909, the character $D_c[5(=j)]$ is registered at the i'th location of $RD_t[0]$.

FIG. 20B shows the state of the detection portion data $RD_t[0]$ after the character $D_c[5]$ is registered. The detection portion data $RD_t[0]$ shown in FIG. 20B includes a wildcard. The wildcard search section 401 (FIG. 16) outputs the search result $RD_{t1}$ including the detection portion data $RD_t[t]$ which can include the wildcard.

When the detection portion data includes a wildcard, the character shape search section 402 (FIG. 16) collates the wildcard.

FIG. 21 is a flowchart illustrating processing of collating the wildcard performed by the character shape search section 402. Hereinafter, the processing in each step will be described.

Step S2101: Value "0" is substituted for variable t. Variable t is an index of the detection portion data.

Step 2102: It is determined whether variable t is equal to variable $N_r$ or not. Variable $N_r$ indicates the number of detection portion data included in the search result $RD_{t1}$ obtained by the wildcard search section 401. When it is determined "Yes" in step S2102, the procedure goes to step S2107. The reason is that when variable t is equal to variable $N_r$, the processing of all the detection portion data included in the search result $RD_{t1}$ is completed.

When it is determined "No" in step S2102, the procedure goes to step S2103.

Step S2103: It is determined whether the detection portion data $RD_t[t]$ includes a wildcard or not. When it is determined "Yes" in step S2103, the procedure goes to step S2104.

When it is determined "No" in step S2103, the procedure goes to step S2106.

Step S2104: A keyword character and a character(s) in the character recognition result corresponding to the wildcard are specified.

Step S2105: The keyword character specified in step S2104 is collated in shape with a character(s) in the character recognition result $D_c$. When the keyword character matches the character(s) in the character recognition result $D_c$, the character(s) in the character recognition result $D_c$ which matches the keyword character is registered in the list element which is a wildcard in the detection portion data $RD_t[t]$. When the keyword character does not match the character(s) in the character recognition result $D_c$, the list element which is a wildcard in the detection portion data $RD_t[t]$ remains a wildcard.

Step S2106: Variable t is incremented by 1.

Step S2107: The detection portion including the wildcard is deleted. Among the detection portion data included in the search result $RD_{t1}$, the detection portion data remaining after the deletion (in step S2107) of the detection portion data including the wildcard is output as the search result $RD_t$.

It is assumed that one detection portion data $RD_t[0]$ included in the search result $RD_{t1}$ which is input to the character shape search section 402 (FIG. 16) is in the state shown in FIG. 20B. A specific example of processing the detection portion data $RD_t[0(=t)]$ performed in accordance with FIG. 21 will be described.

Since the detection portion data $RD_t[0]$ includes a wildcard, it is determined "Yes" in step S2103.

In step S2104, the keyword character corresponding to the wildcard is specified by checking the position of the wildcard in the detection portion data $RD_t[0]$. As a result, the keyword character corresponding to the wildcard is specified as $K_w[2]$.

Thus, among at least one keyword character (first character) included in the keyword $K_w$, the character shape search section 402 specifies the first character(s) which does not match the character recognition result $D_c$ as a first non-matching character (in this case, $K_w[2]$).

In step S2104, the character(s) in the character recognition result $D_c$ corresponding to the wildcard is specified as follows. The character(s) in the character recognition result $D_c$ corresponding to the wildcard is one character, or a combination of two or more continuous characters, and is referred to as a second non-matching character. The "second non-matching character" can include a plurality of characters when two or more continuous characters are so specified.

In the detection portion data $RD_t[0]$, the character $D_c[1]$ exists to the left of the wildcard. Thus, the second non-matching character is considered to include the character $D_c[2]$ as the character at the left end. However, it is not known which of the characters $D_c[2]$ through $D_c[4]$ is the character at the right end of the second non-matching character at this point. In other words, it is not known whether the second non-matching character is made of only the character $D_c[2]$, the characters $D_c[2]$ and $D_c[3]$, or the characters $D_c[2]$, $D_c[3]$ and $D_c[4]$. It is not necessary to consider the possibility that the character at the right end of the second non-matching character $D_c[5]$. The reason is that the character $D_c[5]$ is already registered at the third position of the detection portion data $RD_t[0]$.

In step S2104, the second non-matching character which has a width closest to the width of the first non-matching character is specified. The width of the second non-matching character is defined as a width of an area including partial areas respectively assigned to characters included in the second non-matching character.

In this manner, the character shape search section 402 acts as a second non-matching character specification section in step S2104 for specifying one character, or two or more continuous characters, having a width closest to the width of the first non-matching character among at least one second character as a second non-matching character.

Figure 22:
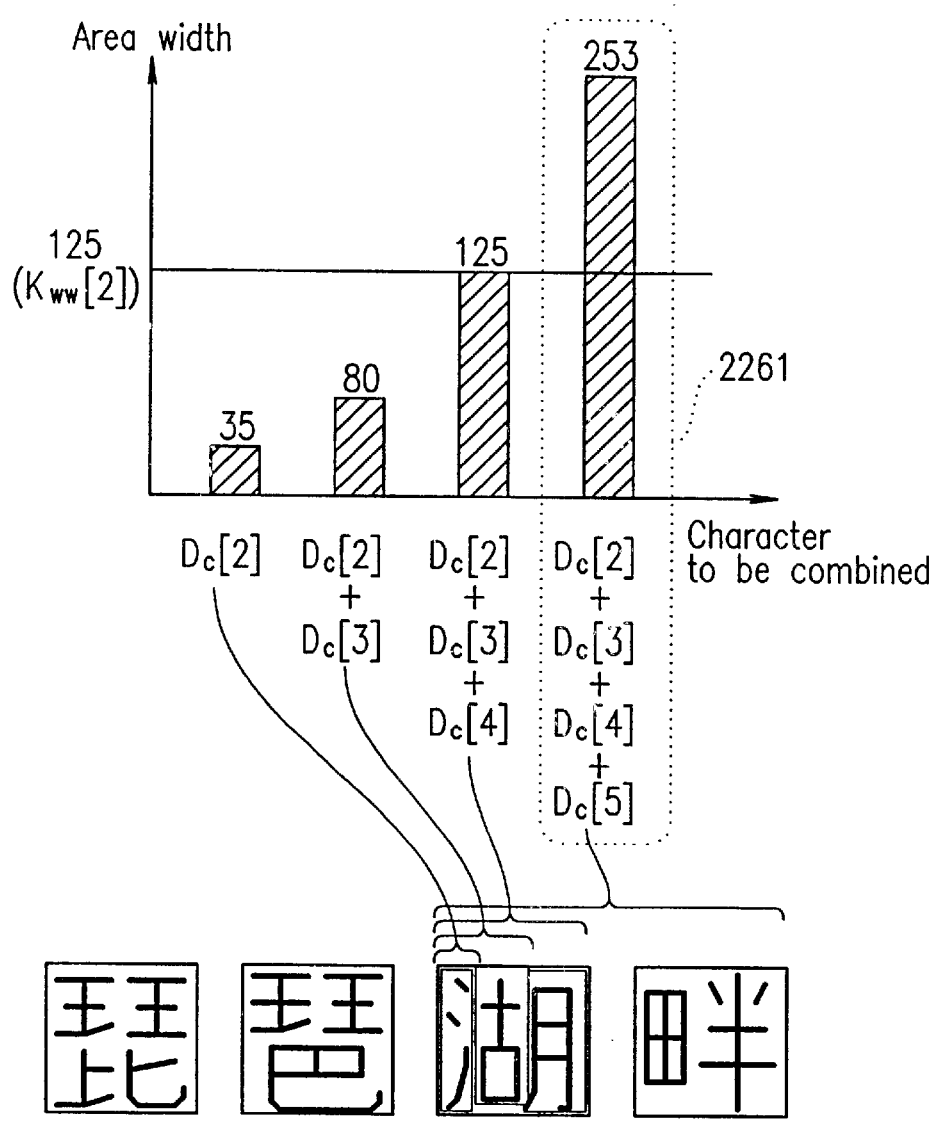
FIG. 22 shows the relationship between characters to be combined and the area width.

FIG. 22 is a graph illustrating the relationship between the combined characters and the area width.

The width of the character $D_c[2]$ is 35, and the area width of the combination of characters $D_c[2]$ and $D_c[3]$ is 80. The area width of the combination of characters $D_c[2]$, $D_c[3]$ and $D_c[4]$ is 125. Such an area width is obtained by the character coordinates shown in FIG. 2B.

The character width $K_{ww}[2]$ of the keyword character $K_w[2]$ is obtained by the character width estimation section 403. When $K_{ww}[2]=125$, the combination of characters $D_c[2]$, $D_c[3]$ and $D_c[4]$ is specified as the second non-matching character having a width closest to the width of the first non-matching character ($K_w[2]$ in this case). The combination of characters $D_c[2]$, $D_c[3]$ and $D_c[4]$ will be described as list ($D_c[2]$, $D_c[3]$, $D_c[4]$).

In step S2105 (FIG. 21), the keyword character $K_w[2]$ is collated in shape with the list ($D_c[2]$, $D_c[3]$, $D_c[4]$). The collation is performed by comparing the feature amount of the character image surrounded by a quadrangle including the areas assigned to the characters $D_c[2]$ through $D_c[4]$ (obtained from the document image $D_i$) with the feature amount of the character image of the keyword character $K_w[2]$ (obtained from the character image table 404 (FIG. 16)). Each feature amount is a vector amount. When the Euclid distance between the two feature amounts is smaller than a prescribed threshold value $Thd_1$, the list ($D_c[2]$, $D_c[3]$, $D_c[4]$) is registered at the second location of the detection portion data $RD_t[0]$. Alternatively, a character indicated in FIG. 22 with reference numeral 2262 can be newly created and registered at the second location of the detection portion data $RD_t[0]$. The newly created character 2262 indicates the combination of the characters $D_c[2]$, $D_c[3]$ and $D_c[4]$.

In this manner, the character shape search section 402 also acts as a second determination section in step S2105 for determining whether or not the first non-matching character matches the second non-matching character by comparing a feature amount of the image of the keyword character $K_w[2]$ (first non-matching character) with a feature amount of the image of an area including one partial area, or two or more partial areas, assigned to the characters $D_c[2]$, $D_c[3]$, and $D_c[4]$ included in the second non-matching character (one second character, or two or more continuous second characters).

In another example in which the keyword is "琵琶湖 ('biwako')" and the wildcard is at the end of the detection portion data as the detection portion data $RD_t[0]$ shown in FIG. 18, the second non-matching character can be specified by similar processing.

In the detection portion data $RD_t[0]$ (FIG. 18), the character $D_c[1]$ is registered at the list element to the left of the wildcard. Therefore, the character at the left end of the second non-matching character is considered to be $D_c[2]$. The second non-matching character is specified by making the number of the characters to be combined variable while the character $D_c[2]$ is fixed and repeating the comparison between the width of the keyword character $K_w[2]$ and the area width (width of the at least one character combined, i.e., the width of the second non-matching character). The second non-matching character can be specified as follows. A tolerable range of values for the width of the second non-matching character is calculated in accordance with the width of the keyword character $K_w[2]$, and the second non-matching character is specified under the condition that the width of the second non-matching character fits within the tolerable range. For example, when the tolerable range is 1.2 times the width of the keyboard character $K_w[2]$, the area width when the four characters are combined ($D_c[2]+D_c[3]+D_c[4]+D_c[5]$) is 253 as shown in FIG. 22 with reference numeral 2261, which is outside the tolerable range (125× 1.2=150). Accordingly, it is not necessary to consider the case where the four or more characters are combined. Thus, the combination of the characters $D_c[2]$, $D_c[3]$ and $D_c[4]$ is specified as the second non-matching character.

In still another example where a plurality of wildcards continuously exist, the second non-matching character for each wildcard can be specified by the above-described processing.

In the above-described example, the second non-matching character is specified while the character at the left end of the second non-matching character ($D_c[2]$) is fixed and the number of characters combined to the right thereof is variable. By contrast, the second non-matching character can be specified while the character at the right end of the second non-matching character is fixed and the number of characters combined to the left thereof is variable by the processing similar to that described above.

In the case where a plurality of wildcards continuously exist or a wildcard exists at the end of the detection portion data, a character or characters which are possibly specified as the second non-matching character can be divided into elements as small as possible and the processing of steps S2104 and S2105 can be performed for the elements. Such a division is performed so that search omissions can be prevented even when the OCR device 202 (FIG. 1) recognizes adjacent characters as one character. When the characters are written horizontally, the division is performed in, for example, a portion where projective histogram of black pixels obtained in the vertical direction is smaller than a predetermined threshold value.

In the above-described example, the wildcard section section 401 (FIG. 16) outputs, as the search result $RD_{r1}$, detection portion data which indicates that at least one keyword character in the keyword $K_w$ matches the recognition result $D_c$. Alternatively, detection portion data which indicates that at least a prescribed designated number of keyword characters matches the recognition result $D_c$ can be output as the search result $RD_{r1}$. For example, the wildcard search section 401 can output, as the search result $RD_{r1}$, detection portion data which indicates that at least half of the keyword characters match the recognition result $D_c$.

In the above description, the wildcard search section 401 determines whether the character code of a keyword character matches the character code of a character in the character recognition result $D_c$ or not. Alternatively, it can be determined whether the character code of a character similar to a keyword character matches the character code of a character in the character recognition result $D_c$ or not. The similar characters are characters having similar shapes such as, for example, ("タ ('ta')" ("katakana" phonetic character) and "夕 ('yu')" (Chinese character) and ("犬 ('inu')", "大 ('dai')" and "太 ('futo')").

As described above, as long as the at least one of the keyword characters in the keyword $K_w$ matches a character in the character recognition result $D_c$ as a result of the comparison of the character codes, the document search device 451 in the second example according to the present invention collates the keyword character with a portion in the vicinity of the corresponding character in the character recognition result $D_c$ based on the comparison of the feature amounts of the character images. It is not necessary that all the keyword characters in the keyword $K_w$ should match characters in the character recognition result $D_c$ as a result of the comparison of the character codes. Accordingly, the search omissions caused by a recognition error can be reduced.

In addition, the target of the search based on the feature amounts of the images is limited to the detection portion which matches at least one keyword characters as a result of the comparison of the character codes. Therefore, the cost (time and calculation amount) for the search is kept relatively low.

EXAMPLE 3

FIG. 23 shows a structure of a document search system 1561 in a third example according to the present invention. The document search system 1561 is an example of using any of the document search devices described in the first and second examples.

The document search system 1561 includes a first communication section 1501, a central station 1502, an image registration server 1503, an image search server 1504, an image data base 1505, a second communication section 1506, and a terminal 1507.

The first communication section 1501 and the second communication section 1506 communicate with each other through a communication line 1509. The communication line 1509 can be, for example, a telephone line (including PHS and cellular phones) or a network (wireless or cable).

The image registration server 1503 has a function of character recognition by OCR.

The terminal 1507 includes, for example, a scanner and can obtain document image data from an original document. Alternatively, the terminal 1507 can obtain document image data taken by a digital camera.

The image search server 1504 includes, for example, any of the document search devices described in first and second examples.

The user inputs document image data obtained by a scanner, a digital camera or the like to the terminal 1507. The terminal 1507 sends the document image data to the central station 1502. The central station 1502 receives the document image data and sends it to the image registration server 1503. The image registration server 1503 performs character recognition of the document image data using OCR, and stores the character recognition result and the document image data in the image data base 1505.

The user can search for and retrieve the document stored in the image data base 1505 from any terminal communicable with the central section 1502. The user can also utilize the services such as, for example, viewing, printing, and circulating. The document stored in the document data base 1505 is viewed through image viewing software. As the image viewing software, for example, a browser for viewing HTML (Hyper Text Markup Language) format documents is usable.

The central station 1502 has an individual identification function, and thus can specialize the image data base 1505 for each user or charge each user for service.

The individual identification function is provided by a fingerprint collation system or a password by a known technology.

Thus, the document search system 1561 in the third example according to the present invention can allow the user to view and retrieve a document owned by the user anytime, anywhere.

The document search processing described above in the first and second examples can be stored in a recording medium in the form of a program. As the recording medium, any type of recording medium, the content of which can be read by a computer, such as a floppy disk, a CD-ROM or the like can be used. By installing the document search program read from the recording medium in a computer, the computer can function as the document search device.

In the first and second examples, the present invention is described using the Japanese documents. The present invention is not limited to Japanese documents, and can be applicable to documents of any language (for example, Chinese, English and Korean).

In the first and second examples, the threshold value $Thd_1$ used by the shape collation section for comparing the feature amount of the character image $KC_i$ of a keyword character with the feature amount of the character image $C_i$ in the document image data is prescribed. The threshold value $Thd_1$ can be variable in accordance with the character codes of the keyword characters. For example, the threshold value $Thd_1$ can be obtained by obtaining the probability distribution of the distance between the feature amount of the font used and the feature amount of the character image in the document image data in advance using a character image table, and then setting an arbitrary probability value. By controlling the threshold value $Thd_1$, the search accuracy can be freely controlled.

The present invention provides a document search device for reducing search omissions and a recording medium having a program for the document search stored thereon.

According to the present invention, when a keyword is searched for in a character recognition result, a search based on a comparison of character codes is first performed. Then, among the portion of the character recognition result which does not match the keyword as a result of the comparison of the character codes, a search is performed based on a comparison of feature amounts of the images in a portion which fulfills a prescribed condition. The search omission which can occur in the search based on the comparison of the character codes can be compensated for by the search based on the comparison of the feature amounts. Accordingly, the search omissions can be reduced. Since the target of the search based on the comparison of the feature amounts of the images is limited to a portion which fulfills a prescribed condition, the cost (time and calculating amount) for the search can be kept relatively low.

According to the present invention, as long as at least one of keyword characters in a keyword matches a character in the character recognition result as a result of the comparison of the character codes, collation based on a comparison of the feature amounts of the images is performed in the vicinity of the character matching between the keyword and the character recognition result. It is not necessary that all the keyword characters in the keyword should match characters in the character recognition result as a result of the comparison of the character codes. Accordingly, the search omissions caused by a recognition error can be reduced. Since the target of the search based on the comparison of the feature amounts of the images is limited to a portion in which at least one keyword character matches a character in the character recognition result, the cost (time and calculation amount) for the search can be kept relatively low.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A recording medium having a program for executing a document search of a keyword in a recognition result obtained as a result of character recognition of a document image, the program including the steps of:

determining whether or not the recognition result includes a partially matching portion with which a part of the keyword matches but the entirety of the keyword does not match, in accordance with a first reference;

specifying a first non-matching portion of the keyword which does not match the recognition result when the recognition result includes the partially matching portion;

specifying a second non-matching portion, in the partially matching portion, which has a width closest to the width of the first non-matching portion; and determining whether the first non-matching portion matches the second non-matching portion, in accordance with a second reference which is different from the first reference.

2. A document search device for searching for a keyword in a recognition result obtained by character recognition performed on a document image, the document search device comprising:

a first determination section for determining whether or not the recognition result includes a partially matching portion with which a part of the keyword matches but the entirety of the keyword does not match, in accordance with a first reference;

a first non-matching portion specification section for, when the recognition result includes the partially matching portion, specifying a first non-matching portion of the keyword which does not match the recognition result;

a second non-matching portion specification section for specifying a second non-matching portion having a width closest to a width of the first non-matching portion in the partially matching portion; and a second determination section for determining whether or not the first non-matching portion matches the second non-matching portion in accordance with a second reference which is different from the first reference.

3. A document search device for searching for a keyword in a recognition result obtained by character recognition performed on a document image, wherein:

the keyword includes at least one first character, and a character code is assigned to each of the at least one first character, and the recognition result includes at least one second character, and a character code and an area of the document image are assigned to each of the at least one second character, the document search device comprising:

a first determination section for determining whether or not at least a part of the keyword matches at least a part of the recognition result based on a comparison of the character code assigned to the at least one first character with the character code assigned to the at least one second character;

a first non-matching character specification section for, when a part of the keyword matches the at least a part of the recognition result, specifying a first character among the at least one first character included in the keyword as a first non-matching character;

a second non-matching character specification section for specifying one second character or two or more continuous second characters, having a width closest to a width of the first non-matching character, among the at least one second character included in the recognition result as a second non-matching character; and a second determination section for determining whether or not the first non-matching character matches the second non-matching character based on a comparison of a feature amount of an image of the first non-matching character with a feature amount of an image of an area including one partial area or two or more partial areas assigned to the one second character or two or more continuous second characters included in the second non-matching character.

4. A document search device according to claim 3, wherein the second non-matching character specification section specifies the second non-matching character by making the number of at least one second character variable and repeating a comparison of the width of the first non-matching character and the width of the at least one second character.

5. A document search device according to claim 3, wherein the second non-matching character specification section calculates a tolerable range of width of the second non-matching character in accordance with the width of the first non-matching character and specifies the second non-matching character under the condition that the second non-matching character has a width within the tolerable range of width.

6. A document search device for searching for a keyword in a recognition result obtained by character recognition performed on a document image, wherein:

the keyword includes at least one first character, and a character code is assigned to each of the at least one first character, and the recognition result includes at least one second character, and a character code and a partial area of the document image are assigned to each of the at least one second character, the document search device comprising:

a first matching portion specification section for determining whether or not the recognition result includes at least one first matching portion which matches the keyword based on a comparison of the character code assigned to the at least one first character with the character code assigned to the at least one second character, and for specifying the at least one first matching portion when the recognition result includes the at least one first matching portion;

a first portion specification section for determining whether or not a remaining part of the recognition result other than the at least one first matching portion includes at least one first portion which fulfills a prescribed first condition, and for specifying the at least one first portion when the remaining part includes the at least one first portion; and a second matching portion specification section for determining whether or not the at least one first portion includes at least one second matching portion which matches the keyword based on a comparison of a feature amount of the partial area of the document image assigned to the at least one second character included in the at least one first portion with a feature amount of an image of at least one first character included in the keyword, and for specifying the at least one second matching portion when the at least one first portion includes the at least one second matching portion, wherein the prescribed first condition includes a condition that the at least one first portion is in the vicinity of a specific second character having a width small then a prescribed value.

7. A document search device according to claim 6, wherein the second matching portion specification section includes:

a first determination section for determining whether or not the character code of a specific second character included in the at least one first portion matches the character code of a specific first character included in the keyword;

a non-matching character specification section for, when the character code of the specific second character included in the at least one first portion does not match the character code of the specific first character included in the keyword, specifying one second character or two or more continuous second characters which include at least the specific second character included in the at least one first portion and has a width closest to a width of the specific first character as a non-matching character, and a second determination section for, when a distance between a feature amount of an image of the specific first character and a feature amount of an image of an area including one partial area or two or more partial areas assigned to the one second character or two or more continuous second characters included in the non-matching character is smaller than a prescribed value, determining that the specific first character matches the non-matching character.

8. A document search device according to claim 6, further comprising:

a calculation section for calculating a prescribed determination reference value from the at least one first matching portion, and a detection section for detecting a second matching portion which fulfills a prescribed second condition among the at least one second matching portion based on the prescribed determination reference value.

9. A document search device according to claim 8, wherein the calculation section calculates the prescribed determination reference value based on the feature amount of the document image of the at least one area assigned to the at least one second character included in the at least one first matching portion, and the prescribed second condition includes a condition that a distance between the feature amount of the document image of the at least one partial area assigned to the at least one second character included in the at least one second matching portion and the prescribed determination reference value is smaller than a prescribed value.

10. A document search device for searching for a keyword in a recognition result obtained by character recognition performed on a document image, wherein:

the keyword includes at least one first character, and a character code is assigned to each of the at least one first character, and the recognition result includes at least one second character, and a character code and a partial area of the document image are assigned to each of the at least one second character, the document search device comprising:

a first matching portion specification section for determining whether or not the recognition result includes at least one first matching portion which matches the keyword based on a comparison of the character code assigned to the at least one first character with the character code assigned to the at least one second character, and for specifying the at least one first matching portion when the recognition result includes the at least one first matching portion;

a first portion specification section for determining whether or not a remaining part of the recognition result other than the at least one first matching portion includes at least one first portion which fulfills a prescribed first condition, and for specifying the at least one first portion when the remaining part includes the at least one first portion; and a second matching portion specification section for determining whether or not the at least one first portion includes at least one second matching portion which matches the keyword based on a comparison of a feature amount of the partial area of the document image assigned to the at least one second character included in the at least one first portion with a feature amount of an image of at least one first character included in the keyword, and for specifying the at least one second matching portion when the at least one first portion includes the at least one second matching portion, wherein a reliability degree of character recognition is further assigned to each of the at least one second character, and the prescribed first condition includes a condition that the at least one first portion is in the vicinity of a specific second character having the reliability degree lower than a prescribed threshold value.

11. A document search device according to claim 10, further comprising:

a section for determining an image quality of the document image, and a section for determining the prescribed threshold value based on the image quality of the document stage.

12. A document search device according to claim 10, wherein the second matching portion specification section includes:

a first determination section for determining whether or not the character code of a specific second character included in the at least one first portion matches the character code of a specific first character included in the keyword;

a non-matching character specification section for, when the character code of the specific second character included in the at least one first portion does not match the character code of the specific first character included in the keyword, specifying one second character or two or more continuous second characters which include at least the specific second character included in the at least one first portion and has a width closest to a width of the specific first character as a non-matching character, and a second determination section for, when a distance between a feature amount of an image of the specific first character and a feature amount of an image of an area including one partial area or two or more partial areas assigned to the one second character or two or more continuous second characters included in the non-matching character is smaller than a prescribed value, determining that the specific first character matches the non-matching character.

13. A document search device according to claim 10, further comprising:

a calculation section for calculating a prescribed determination reference value from the at least one first matching portion, and a detection section for detecting a second matching portion which fulfills a prescribed second condition among the at least one second matching portion based on the prescribed determination reference value.

14. A document search device according to claim 13, wherein the calculation section calculates the prescribed determination reference value based on the feature amount of the document image of the at least one area assigned to the at least one second character included in the at least one first matching portion, and the prescribed second condition includes a condition that a distance between the feature amount of the document image of the at least one partial area assigned to the at least one second character included in the at least one second matching portion and the prescribed determination reference value is smaller than a prescribed value.

* * * * *

UNITED STATES PATENT AND TRADEMARK OFFICE
CERTIFICATE OF CORRECTION

PATENT NO.     : 6,470,336 B1                                        Page 1 of 1
DATED          : October 22, 2002
INVENTOR(S)    : Yoshihiko Matsukawa et al.

It is certified that error appears in the above-identified patent and that said Letters Patent is hereby corrected as shown below:

<u>Title page, Item [54] and Column 1, line 1,</u>
Delete "IMAGE".

<u>Title page,</u>
Item [57], ABSTRACT,
Line 18, change "include" to -- included --.

<u>Column 35,</u>
Line 45, change "small" to -- smaller --.

<u>Column 37,</u>
Line 6, change "stage" to -- image --.

Signed and Sealed this

Twenty-seventh Day of May, 2003

JAMES E. ROGAN
*Director of the United States Patent and Trademark Office*